US012770554B2

(12) United States Patent
Choi et al.

(10) Patent No.: US 12,770,554 B2
(45) **Date of Patent: *Oct. 20, 2026**

(54) SCAN DRIVER

(71) Applicant: Samsung Display Co., Ltd., Yongin-Si (KR)

(72) Inventors: Yang Hwa Choi, Yongin-si (KR); Bo Yong Chung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/083,438

(22) Filed: Mar. 19, 2025

(65) Prior Publication Data

US 2025/0218354 A1 Jul. 3, 2025

Related U.S. Application Data

(63) Continuation of application No. 18/375,566, filed on Oct. 2, 2023, now Pat. No. 12,272,297, which is a (Continued)

(30) Foreign Application Priority Data

Aug. 28, 2019 (KR) ........................ 10-2019-0105870

(51) Int. Cl.
*G09G 3/32* (2016.01)
*G09G 3/3266* (2016.01)

(52) U.S. Cl.
CPC ............. *G09G 3/32* (2013.01); *G09G 3/3266* (2013.01); *G09G 2300/0852* (2013.01); (Continued)

(58) Field of Classification Search
CPC ... G09G 3/32–3291; G09G 2300/0421; G09G 2300/0426; G09G 2300/0804; (Continued)

(56) References Cited

U.S. PATENT DOCUMENTS 9,071,230 B2 6/2015 Kim et al.
9,685,948 B2 6/2017 Kim et al.
(Continued)

FOREIGN PATENT DOCUMENTS

KR 10-2010-0075141 A 7/2010
KR 10-2016-0053191 A 5/2016
(Continued)

OTHER PUBLICATIONS

Kim Kyung Min, et al. “Bezel Free Design of Organic Light Emitting Diodes via a-InGaZnO Gate Driver Circuit Integration within Active Array”, Journal of the Society for Information Display (SID), dated Jul. 15, 2019, pp. 1-5.
(Continued)

*Primary Examiner* — Nathan Danielsen
(74) *Attorney, Agent, or Firm* — Innovation Counsel LLP

(57) ABSTRACT

A scan driver includes a first transistor including gate, first, and second electrodes coupled to a Q node, a scan clock line, and a scan line. A second transistor includes gate and first electrodes coupled to a scan carry line, and a second electrode coupled to the Q node. A third transistor includes gate and first electrodes coupled to a first control line and a sensing carry line. A fourth transistor includes a gate and first electrode coupled to the sensing carry line and the third transistor first electrode. A fifth transistor includes gate, first, and second electrodes coupled to a fourth transistor second electrode, a second control line, and a node. A capacitor includes first and second electrodes coupled to the fifth transistor first and gate electrodes. A sixth transistor includes gate, first, and second electrodes coupled to a third control line, the node, and the Q node.

20 Claims, 9 Drawing Sheets

Related U.S. Application Data continuation of application No. 17/827,272, filed on May 27, 2022, now Pat. No. 11,817,042, which is a continuation of application No. 16/941,140, filed on Jul. 28, 2020, now Pat. No. 11,348,513.

(52) U.S. Cl.
CPC ............... *G09G 2310/0264* (2013.01); *G09G 2310/0286* (2013.01); *G09G 2310/06* (2013.01)

(58) Field of Classification Search
CPC ... G09G 2300/0852; G09G 2310/0264; G09G 2310/0267; G09G 2310/0286; G09G 2310/06; G09G 2310/067; G09G 2310/08; G09G 2320/0233; G09G 2320/0242; G09G 2320/0252; G09G 2320/04; G09G 2320/043; G09G 2320/045
See application file for complete search history.

(56) References Cited

U.S. PATENT DOCUMENTS

| | | | | |
|---|---|---|---|---|
| 9,830,845 | B2 | 11/2017 | Lim et al. | |
| 9,875,710 | B2 | 1/2018 | Kim et al. | |
| 10,324,561 | B2 | 6/2019 | Cho et al. | |
| 10,997,910 | B2 | 5/2021 | Hwang et al. | |
| 2009/0189677 | A1 | 7/2009 | Lee et al. | |
| 2010/0156474 | A1 | 6/2010 | Park et al. | |
| 2016/0217728 | A1 | 7/2016 | In et al. | |
| 2016/0293094 | A1 | 10/2016 | Park et al. | |
| 2017/0162122 | A1 | 6/2017 | In | |
| 2017/0186394 | A1 | 6/2017 | Park et al. | |
| 2018/0018921 | A1 | 1/2018 | Park et al. | |
| 2018/0337682 | A1* | 11/2018 | Takasugi .............. | G09G 3/3266 |
| 2019/0019462 | A1 | 1/2019 | Kim et al. | |
| 2019/0130842 | A1 | 5/2019 | Jang et al. | |
| 2020/0027516 | A1 | 1/2020 | Feng | |
| 2020/0066211 | A1 | 2/2020 | Lee et al. | |
| 2020/0184898 | A1 | 6/2020 | Choi et al. | |
| 2020/0193912 | A1* | 6/2020 | Park ..................... | G09G 3/3275 |
| 2020/0219451 | A1 | 7/2020 | Kim | |
| 2020/0243018 | A1 | 7/2020 | Kim et al. | |
| 2020/0372851 | A1 | 11/2020 | Kim et al. | |
| 2021/0065617 | A1 | 3/2021 | Choi et al. | |
| 2021/0074220 | A1 | 3/2021 | Kim et al. | |
| 2021/0158760 | A1 | 5/2021 | Jang | |
| 2021/0366402 | A1 | 11/2021 | In et al. | |

FOREIGN PATENT DOCUMENTS

| | | | |
|---|---|---|---|
| KR | 10-2017-0026760 | A | 3/2017 |
| KR | 10-2017-0049002 | A | 5/2017 |
| KR | 10-2017-0078978 | A | 7/2017 |
| KR | 10-2018-0007719 | A | 1/2018 |
| KR | 10-2018-0066375 | A | 6/2018 |
| KR | 10-2018-0128123 | A | 12/2018 |
| KR | 10-2019-0009019 | A | 1/2019 |
| KR | 10-2020-0085976 | A | 7/2020 |
| KR | 10-2020-0094895 | A | 8/2020 |
| KR | 10-2020-0135633 | A | 12/2020 |
| KR | 10-2021-0027576 | A | 3/2021 |
| KR | 10-2523280 | B1 | 4/2023 |
| KR | 10-2634178 | B1 | 2/2024 |
| KR | 10-2650560 | B1 | 3/2024 |

OTHER PUBLICATIONS

Shin Hong-Jae, et al. "A Novel OLED Display Panel with High-Reliability Integrated Gate Driver Circuit using IGZO TFTs for Large-Sized UHD TVs." Journal of the Society for Information Display (SID) 2018 Digest, dated May 30, 2018, pp. 358-361.

Notice of Allowance dated Sep. 21, 2023, 6 pages. Issued for the Korean Patent Application No. 10-2019-0012204 and is corresponding to the cross-referenced co-pending U.S. Pat. No. 11,282,463.

Korean Notice of Allowance corresponding to Application No. 10-2019-0105870 and issued on Oct. 11, 2024, 6 pages.

* cited by examiner

<DISPLAY PERIOD>

<SENSING PERIOD>

SCAN DRIVER

CROSS-REFERENCE TO RELATED APPLICATION

The present application is a continuation of U.S. patent application Ser. No. 18/375,566 filed on Oct. 2, 2023, now U.S. Pat. No. 12,272,297, which is a continuation of U.S. patent application Ser. No. 17/827,272, filed on May 27, 2022, now U.S. Pat. No. 11,817,042, which is a continuation of U.S. patent application Ser. No. 16/941,140 filed on Jul. 28, 2020, now U.S. Pat. No. 11,348,513, which claims priority under 35 U.S.C. § 119 (a) to Korean patent application No. 10-2019-0105870 filed on Aug. 28, 2019, in the Korean Intellectual Property Office, the contents of which are incorporated herein by reference in their entireties.

BACKGROUND

1. Technical Field

The present disclosure generally relates to a scan driver.

2. Related Art

Each pixel of a display device may emit light with a luminance corresponding to a data signal input through a data line. The display device may display a frame image by using a combination of light emitting pixels.

Pixels may be coupled to each data line. Accordingly, a scan driver is required, which provides a scan signal for selecting a pixel to which a data signal is to be supplied among the pixels. The scan driver is configured in a shift register form, to sequentially provide a scan signal having a turn-on level in units of scan lines.

If necessary, a scan driver selectively providing a scan signal having a turn-on level to only a desired scan line is provided, for example, so as to detect mobility information or threshold voltage information of a driving transistor of a pixel.

When a scan signal is provided to a scan line selected for each frame, a relatively long time may be taken to provide the scan signal to all scan lines, i.e., to acquire specific information such as mobility information or threshold voltage information of the driving transistor, of all pixels in the display device.

SUMMARY

Embodiments provide a scan driver capable of selecting scan lines in one frame and sequentially providing a scan signal to the selected scan lines.

In accordance with an aspect of the present disclosure, there is provided a scan driver including scan stages, wherein a first scan stage among the scan stages includes: a first transistor including a gate electrode coupled to a first Q node, a first electrode coupled to a first scan clock line, and a second electrode coupled to a first scan line; a second transistor including a gate electrode, a first electrode, and a second electrode, the gate electrode and the first electrode of the second transistor being coupled to a first scan carry line, the second electrode of the second transistor being coupled to the first Q node; a third transistor including a gate electrode coupled to a first control line and a first electrode coupled to a first sensing carry line; a fourth transistor including a gate electrode coupled to the first sensing carry line and a first electrode coupled to the first electrode of the third transistor; a fifth transistor including a gate electrode coupled to a second electrode of the fourth transistor, a first electrode coupled to a second control line, and a second electrode coupled to a first node; a first capacitor including a first electrode coupled to the first electrode of the fifth transistor and a second electrode coupled to the gate electrode of the fifth transistor; and a sixth transistor including a gate electrode coupled to a third control line, a first electrode coupled to the first node, and a second electrode coupled to the first Q node.

The first scan stage may further include a seventh transistor including a gate electrode coupled to the first Q node, a first electrode coupled to the second control line, and a second electrode coupled to the first node.

A first control signal provided through the first control line may include a plurality of pulses during one frame. The first capacitor is charged with a sensing carry signal provided through the first sensing carry line, during a pulse of the sensing carry signal that overlaps one of the pulses of the first control signal.

The first scan stage may further include: a second capacitor including a first electrode coupled to the gate electrode of the first transistor and a second electrode coupled to the second electrode of the first transistor; an eighth transistor including a gate electrode coupled to the first Q node, a first electrode coupled to a first sensing clock line, and a second electrode coupled to a first sensing line; a third capacitor including a first electrode coupled to the gate electrode of the eighth transistor and a second electrode coupled to the second electrode of the eighth transistor; and a ninth transistor including a gate electrode coupled to the first Q node, a first electrode coupled to a first carry clock line, and a second electrode coupled to a first carry line.

The first scan stage may further include a tenth transistor including a gate electrode coupled to a first reset carry line, a first electrode coupled to the first Q node, and a second electrode coupled to a first power line.

The first scan stage may further include: an eleventh transistor including a gate electrode coupled to a first QB node, a first electrode coupled to the first Q node, and a second electrode coupled to the first power line; and a twelfth transistor including a gate electrode coupled to a second QB node, a first electrode coupled to the first Q node, and a second electrode coupled to the first power line.

The first scan stage may further include: a thirteenth transistor including a gate electrode coupled to the first QB node, a first electrode coupled to the first carry line, and a second electrode coupled to the first power line; a fourteenth transistor including a gate electrode coupled to the second QB node, a first electrode coupled to the first carry line, and a second electrode coupled to the first power line; a fifteenth transistor including a gate electrode coupled to the first QB node, a first electrode coupled to the first sensing line, and a second electrode coupled to a second power line; a sixteenth transistor including a gate electrode coupled to the second QB node, a first electrode coupled to the first sensing line, and a second electrode coupled to the second power line; a seventeenth transistor including a gate electrode coupled to the first QB node, a first electrode coupled to the first scan line, and a second electrode coupled to the second power line; and an eighteenth transistor including a gate electrode coupled to the second QB node, a first electrode coupled to the first scan line, and a second electrode coupled to the second power line.

The first scan stage may further include a nineteenth transistor including a gate electrode coupled to a fourth control line, a first electrode coupled to the gate electrode of the fifth transistor, and a second electrode coupled to the first power line.

The first scan stage may further include: a twentieth transistor including a gate electrode coupled to the fourth control line, a first electrode coupled to the first Q node, and a second electrode coupled to the first power line; a twenty-first transistor including a gate electrode coupled to the first Q node, a first electrode coupled to the first power line, and a second electrode coupled to the first QB node; and a twenty-second transistor including a gate electrode coupled to the first scan carry line, a first electrode coupled to the first power line, and a second electrode coupled to the first QB node.

The first scan stage may further include: a twenty-third transistor including a gate electrode coupled to the second electrode of the third transistor and a first electrode coupled to the first power line; and a twenty-fourth transistor including a gate electrode coupled to the third control line, a first electrode coupled to a second electrode of the twenty-third transistor, and a second electrode coupled to the first QB node.

The first scan stage may further include: a twenty-fifth transistor including a gate electrode and a first electrode, the gate electrode and the first electrode of the twenty-fifth transistor being coupled to a fifth control line; and a twenty-sixth transistor including a gate electrode coupled to a second electrode of the twenty-fifth transistor, a first electrode coupled to the fifth control line, and a second electrode coupled to the first QB node.

The first scan stage may further include: a twenty-seventh transistor including a gate electrode coupled to the first Q node, a first electrode coupled to the gate electrode of the twenty-sixth transistor, and a second electrode coupled to a third power line; and a twenty-eighth transistor including a gate electrode coupled to a second Q node, a first electrode coupled to the gate electrode of the twenty-sixth transistor, and a second electrode coupled to the third power line.

The third transistor may further include: a first sub-transistor including a gate electrode coupled to the first control line and a first electrode coupled to the first sensing carry line; and a second sub-transistor including a gate electrode coupled to the first control line, a first electrode coupled to a second electrode of the first sub-transistor, and a second electrode coupled to the second electrode of the first capacitor. The first scan stage may further include a twenty-ninth transistor including a gate electrode coupled to the second electrode of the second sub-transistor, a first electrode coupled to the first electrode of the second sub-transistor, and a second electrode coupled to the second control line.

A second scan stage among the scan stages may include: a thirtieth transistor including a gate electrode coupled to the second Q node, a first electrode coupled to a second scan line, and a second electrode coupled to a second scan clock line; a fourth capacitor coupling the gate electrode and the a first electrode of the thirtieth transistor to each other; a thirty-first transistor including a gate electrode coupled to the second Q node, a first electrode coupled to a second sensing line, and a second electrode coupled to a second sensing clock line; a fifth capacitor coupling the gate electrode and the first electrode of the thirty-first transistor to each other; and a thirty-second transistor including a gate electrode coupled to the second Q node, a first electrode coupled to a second carry line, and a second electrode coupled to a second carry clock line.

The second scan stage may further include: a thirty-third transistor including a gate electrode coupled to the first QB node, a first electrode coupled to the first power line, and a second electrode coupled to the second Q node; and a thirty-fourth transistor including a gate electrode coupled to the second QB node, a first electrode coupled to the first power line, and a second electrode coupled to the second Q node.

The second scan stage may further include: a thirty-fifth transistor including a gate electrode, a first electrode, and a second electrode, wherein the gate electrode and the second electrode of the thirty-fifth transistor are coupled to a sixth control line; a thirty-sixth transistor including a gate electrode coupled to the first electrode of the thirty-fifth transistor, a first electrode coupled to the second QB node, and a second electrode coupled to the sixth control line; a thirty-seventh transistor including a gate electrode coupled to the first Q node, a first electrode coupled to the third power line, and a second electrode coupled to the gate electrode of the thirty-sixth transistor; and a thirty-eighth transistor including a gate electrode coupled to the second Q node, a first electrode coupled to the third power line, and a second electrode coupled to the gate electrode of the thirty-sixth transistor.

The second scan stage may further include: a thirty-ninth transistor including a gate electrode coupled to the first QB node, a first electrode coupled to the first power line, and a second electrode coupled to the second carry line; a fortieth transistor including a gate electrode coupled to the second QB node, a first electrode coupled to the first power line, and a second electrode coupled to the second carry line; a forty-first transistor including a gate electrode coupled to the first QB node, a first electrode coupled to the second power line, and a second electrode coupled to the second sensing line; a forty-second transistor including a gate electrode coupled to the second QB node, a first electrode coupled to the second power line, and a second electrode coupled to the second sensing line; a forty-third transistor including a gate electrode coupled to the first QB node, a first electrode coupled to the second power line, and a second electrode coupled to the second scan line; and a forty-fourth transistor including a gate electrode coupled to the second QB node, a first electrode coupled to the second power line, and a second electrode coupled to the second scan line.

The second scan stage may further include: a forty-fifth transistor including a gate electrode coupled to the first control line and a first electrode coupled to a second sensing carry line; a forty-sixth transistor including a gate electrode coupled to the second sensing carry line and a first electrode coupled to a second electrode of the forty-fifth transistor; a forty-seventh transistor including a gate electrode coupled to the third control line, a first electrode coupled to the second Q node, and a second electrode coupled to a second node; a forty-eighth transistor including a gate electrode coupled to a second electrode of the forty-sixth transistor, first electrode coupled to the second node, and a second electrode coupled to the second control line; and a sixth capacitor including a first electrode coupled to the gate electrode of the forty-eighth transistor and a second electrode coupled to the second electrode of the forty-eighth transistor.

The second scan stage may further include: a forty-ninth transistor including a first electrode, a gate electrode, and a second electrode, the first electrode of the forty-ninth transistor being coupled to the second Q node, the gate electrode and the second electrode of the forty-ninth transistor being coupled to a second scan carry line; and a fiftieth transistor including a gate electrode coupled to the second Q node, a first electrode coupled to the second control line, and a second electrode coupled to the second node.

The second scan stage may further include: a fifty-first transistor including a gate electrode coupled to a second electrode of the forty-fifth transistor and a first electrode coupled to the first power line; and a fifty-second transistor including a gate electrode coupled to the third control line, a first electrode coupled to a second electrode of the fifty-first transistor, and a second electrode coupled to the second QB node.

The second scan stage may further include: a fifty-third transistor including a gate electrode coupled to the second Q node, a first electrode coupled to the second QB node, and a second electrode coupled to the first power line; and a fifty-fourth transistor including a gate electrode coupled to the first scan carry line, a first electrode coupled to the second QB node, and a second electrode coupled to the first power line.

The second scan stage may further include: a fifty-fifth transistor including a gate electrode coupled to the fourth control line, a first electrode coupled to the first power line, and a second electrode coupled to the second Q node; and a fifty-sixth transistor including a gate electrode coupled to the first reset carry line, a first electrode coupled to the first power line, and a second electrode coupled to the second Q node.

The second scan stage may further include fifty-seventh transistor including a gate electrode coupled to the fourth control line, a first electrode coupled to the first power line, and a second electrode coupled to the gate electrode of the forty-eighth transistor.

The forty-fifth transistor may further include: a third sub-transistor including a gate electrode coupled to the first control line and a first electrode coupled to the second sensing carry line; and a fourth sub-transistor including a gate electrode coupled to the first control line, a first electrode coupled to a second electrode of the third sub-transistor, and a second electrode coupled to the gate electrode of the forty-eighth transistor. The second scan stage may further include a fifty-eighth transistor including a gate electrode coupled to the second electrode of the fourth sub-transistor, a first electrode coupled to the second control line, and a second electrode coupled to the first electrode of the fourth sub-transistor.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
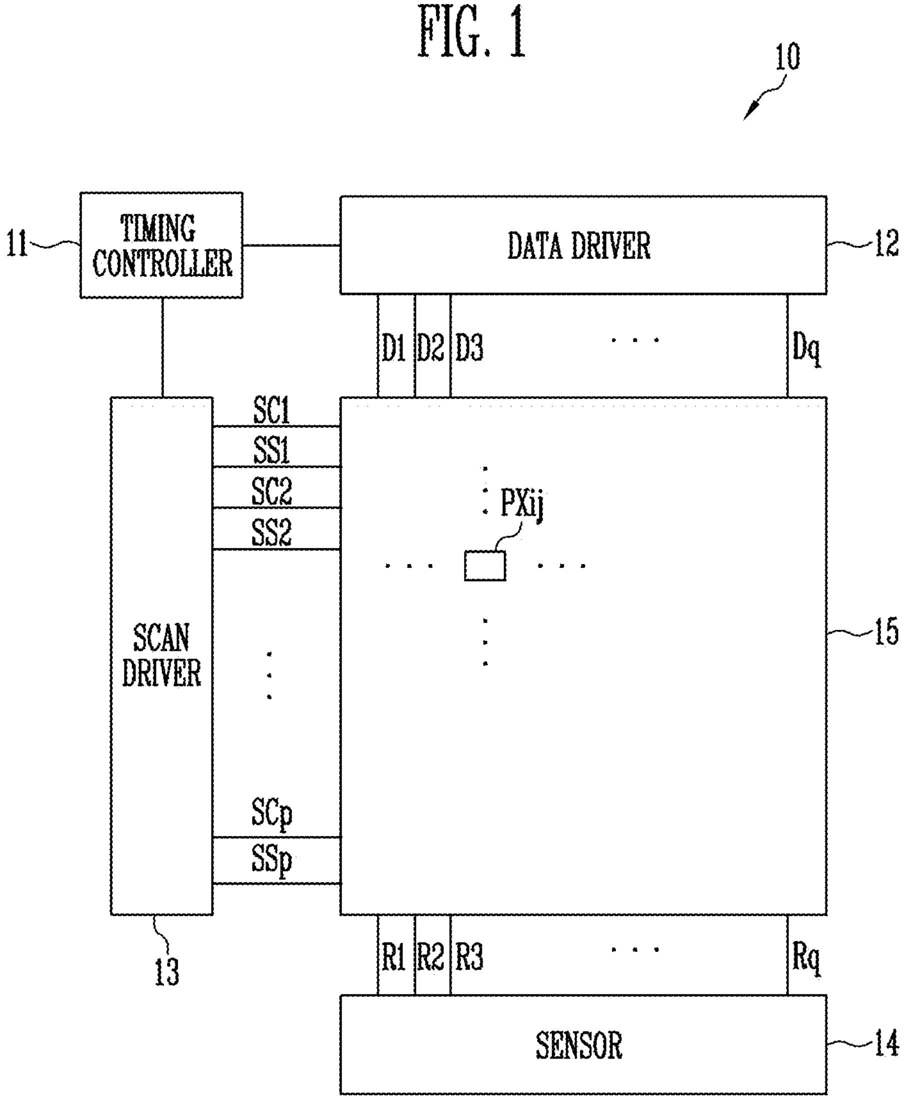
FIG. 1 is a diagram illustrating a display device in accordance with an embodiment of the present disclosure.

Hereinafter, embodiments are described in detail with reference to the accompanying drawings so that those skilled in the art may easily practice the present disclosure. The present disclosure may be implemented in various different forms A part irrelevant to the description will be omitted to clearly describe the present disclosure, and the same or similar constituent elements will be designated by the same reference numerals throughout the specification. Thus, the same reference numerals may be used in different drawings to identify the same or similar elements.

In addition, the size and thickness of each component illustrated in the drawings are arbitrarily shown for better understanding and ease of description. Thicknesses of several portions and regions are exaggerated for clear expressions.

FIG. 1 is a diagram illustrating a display device 10 in accordance with an embodiment of the present disclosure.

Referring to FIG. 1, the display device 10 may include a timing controller 11, a data driver 12, a scan driver 13, a sensor 14, and a pixel unit 15.

The timing controller 11 may provide grayscale values, a control signal, and the like to the data driver 12. Also, the timing controller 11 may provide a clock signal, a control signal, and the like to each of the scan driver 13 and the sensor 14.

The data driver 12 may generate data signals by using the grayscale values, the control signal, and the like, which are received from the timing controller 11. For example, the data driver 12 may sample grayscale values by using a clock signal, and apply data signals corresponding to the grayscale values to data lines D1 to Dq, where q is a positive integer, in units of pixel rows.

The scan driver 13 may generate scan signals to be provided to scan lines SC1, SC2, . . . , and SCp, where p is a positive integer, by receiving the clock signal, the control signal, and the like from the timing controller 11. For example, the scan driver 13 may sequentially provide scan signals having a pulse of a turn-on level to the scan lines SC1, SC2, . . . , and SCp, sometimes referred to as scan lines SC1 to SCp for simplicity. For example, the scan driver 13 may generate scan signals in a manner that sequentially transfers a pulse of a turn-on level to a next scan stage in response to the clock signal. For example, the scan driver 13 may be configured in a shift register form.

Also, the scan driver 13 may generate sensing signals to be provided to sensing lines SS1, SS2, . . . , and SSp. For example, the scan driver 13 may sequentially provide sensing signals having a pulse of a turn-on level to the sensing lines SS1, SS2, . . . , and SSp, sometimes referred to as the sensing lines SS1 to SSp for simplicity. For example, the scan driver 13 may generate sensing signals in a manner that sequentially transfer a pulse of a turn-on level to a next stage in response to the clock signal.

Figure 5:
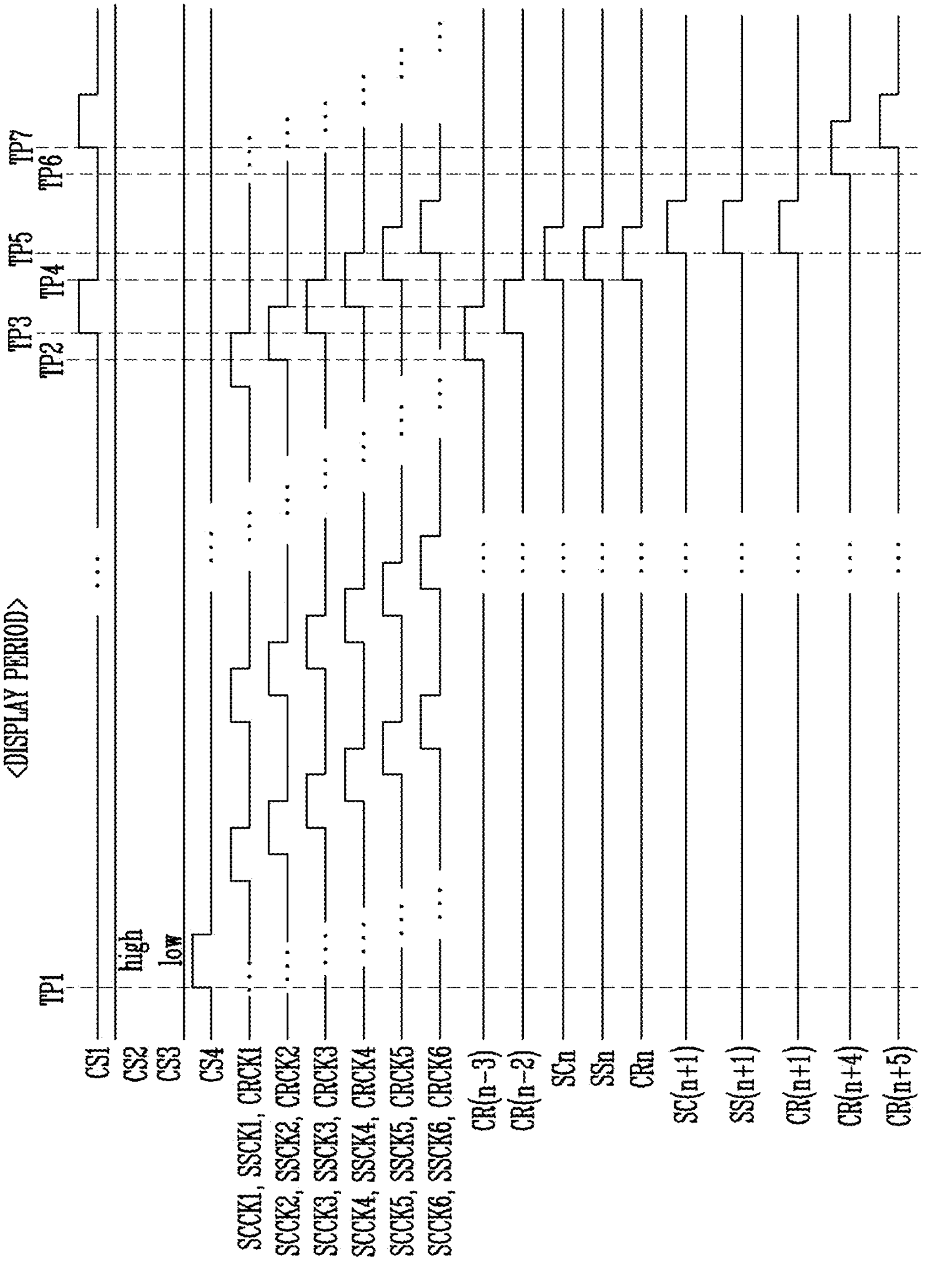
FIG. 5 is a waveform diagram illustrating a driving method of the scan driver shown in FIG. 3 in a display period in accordance with an embodiment.
Figure 7:
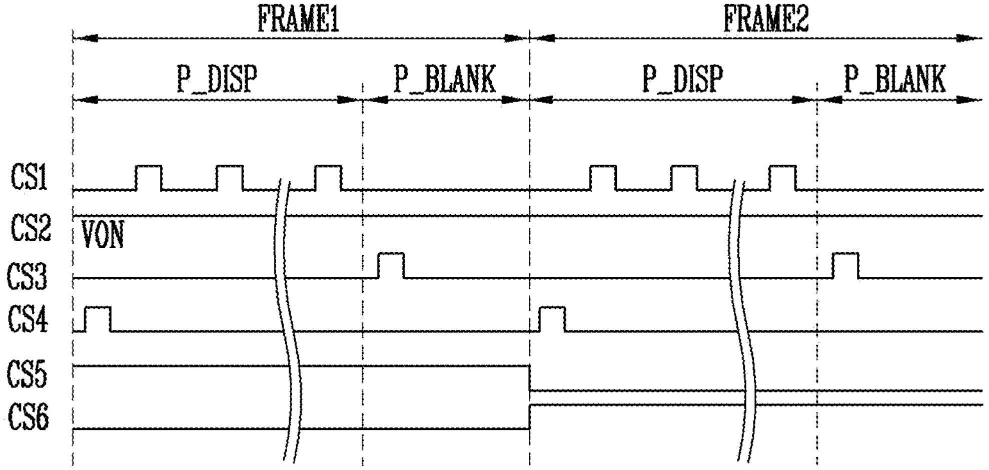
FIG. 7 is a diagram illustrating control signals applied to the scan driver in accordance with an embodiment.

However, an operation of the scan driver 13 is related to an operation in a display period shown in FIG. 5, and an operation in a sensing period shown in FIG. 7 will be separately described. One frame interval (or one frame) may include one display period and one sensing period.

The sensor 14 may measure degradation information of pixels according to currents or voltages received through receiving lines R1, R2, R3, . . . , and Rq. For example, the degradation information of pixels may be mobility information of driving transistors, threshold voltage information of the driving transistors, degradation information of light emitting devices, or other degradation information. Also, the sensor 14 may measure characteristic information of pixels, which is changed depending on an environment, according to the currents or voltages received through the receiving lines R1, R2, R3, . . . , and Rq, sometime referred to as the receiving lines R1 to Rq for simplicity. For example, the sensor 14 may measure characteristic information of pixels, which changes depending on temperature or humidity.

The pixel unit 15 includes pixels, represented by a pixel PXij. Each pixel PXij, where each of i and j is a positive integer, may be coupled to a corresponding data line, a corresponding scan line, a corresponding sensing line, and a corresponding receiving line. The pixel PXij may mean a pixel circuit including a scan transistor coupled to an ith scan line and a jth data line.

Figure 2:
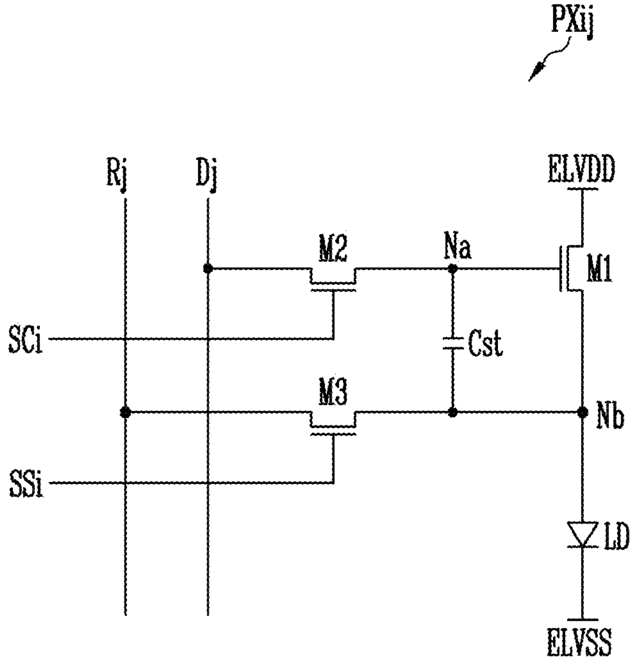
FIG. 2 is a circuit diagram illustrating a pixel included in the display device shown in FIG. 1 in accordance with an embodiment.

FIG. 2 is a circuit diagram illustrating an example of the pixel PXij included in the display device 10 shown in FIG. 1.

Referring to FIG. 2, the pixel PXij may include thin film transistors M1, M2, and M3 (or transistors), a storage capacitor Cst, and a light emitting device LD. The thin film transistors M1, M2, and M3 may be N-type transistors.

A gate electrode of a first thin film transistor M1 may be coupled to a gate node Na. A first electrode (or one electrode,) of the first thin film transistor M1 may be coupled to a power line ELVDD. A second electrode (or the other electrode) of the first thin film transistor M1 may be coupled to a source node Nb. The first thin film transistor M1 may be referred to as a driving transistor.

A gate electrode of a second thin film transistor M2 may be coupled to a scan line SCi. A first electrode of the second thin film transistor M2 may be coupled to a data line Dj. A second electrode of the second thin film transistor M2 may be coupled to the gate node Na. The second thin film transistor M2 may be referred to as a switching transistor, or a scan transistor.

A gate electrode of a third thin film transistor M3 may be coupled to a sensing line SSi. A first electrode of the third thin film transistor M3 may be coupled to a receiving line Ri. A second electrode of the third thin film transistor M3 may be coupled to the source node Nb. The third thin film transistor M3 may be referred to as an initialization transistor, or a sensing transistor.

A first electrode of the storage capacitor Cst may be coupled to the gate node Na. A second electrode of the storage capacitor Cst may be coupled to the source node Nb.

An anode of the light emitting device LD may be coupled to the source node Nb. A cathode of the light emitting device LD may be coupled to a power line ELVSS. The light emitting device LD may be configured as an organic light emitting diode, or an inorganic light emitting diode.

Figure 3:
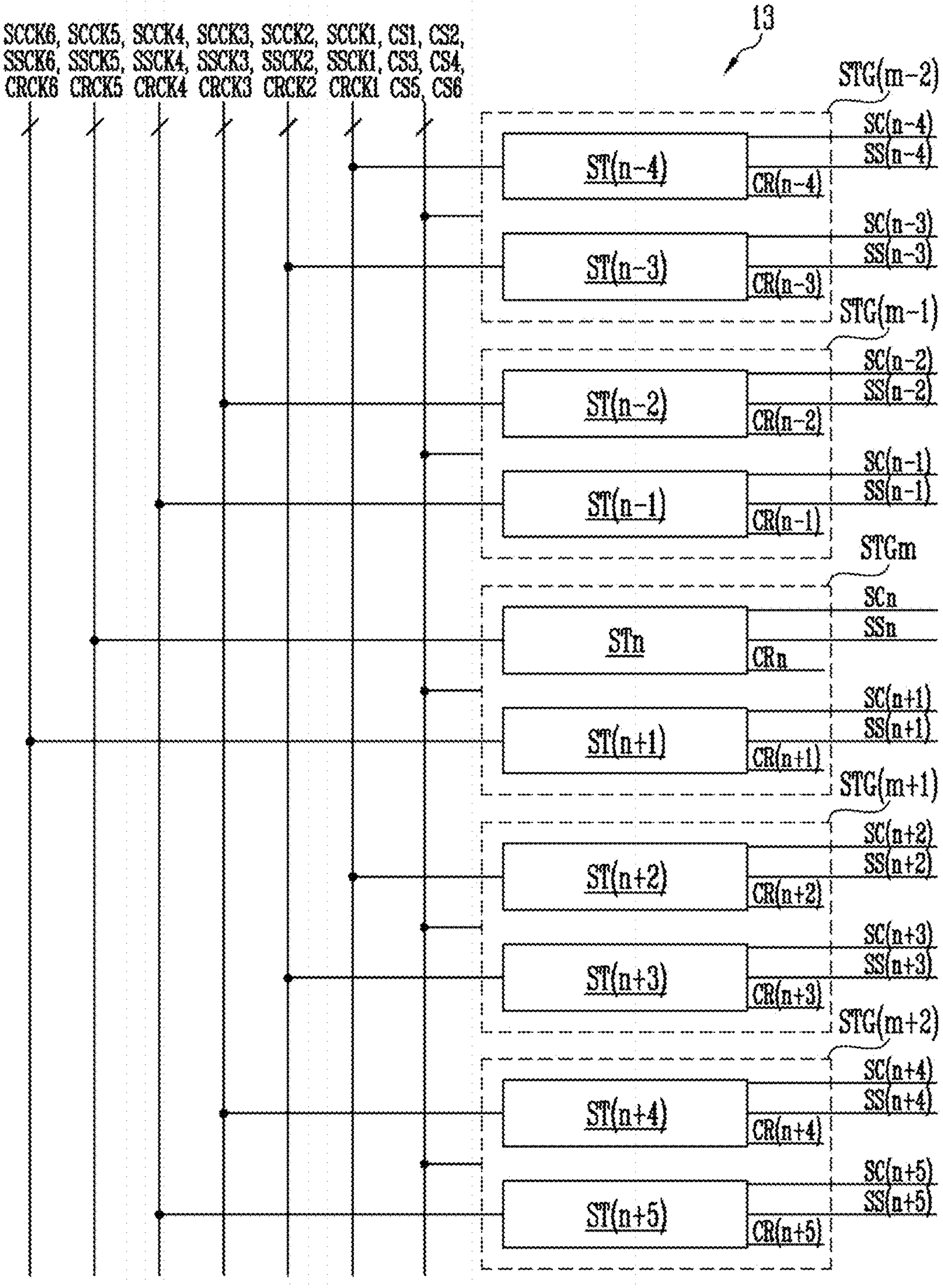
FIG. 3 is a diagram illustrating a scan driver included in the display device shown in FIG. 1 in accordance with an embodiment.

FIG. 3 is a diagram illustrating the scan driver 13 included in the display device shown in FIG. 1 in accordance with an embodiment.

Referring to FIG. 3, the scan driver 13 includes stage groups . . . , STG(m−2), STG(m−1), STGm, STG(m+1), STG(m+2), . . . , where m is an integer of 2 or more. In FIG. 3, only a portion of the scan driver 13 is illustrated for simplicity.

Each of the stage groups STG(m−2) to STG(m+2) may include a first scan stage and a second scan stage. The first scan stage may be an odd-numbered scan stage, and the second scan stage may be an even-numbered scan stage. For example, the (m−2)th stage group STG(m−2) may include an (n−4)th scan stage ST(n−4), where n is an integer of 4 or more, and an (n−3)th scan stage ST(n−3). The (m−1)th stage group STG(m−1) may include an (n−2)th scan stage ST(n−2) and an (n−1)th scan stage ST(n−1). The mth stage group STGm may include an nth scan stage STn and an (n+1)th scan stage ST(n+1). The (m+1)th stage group STG(m+1) may include an (n+2)th scan stage ST(n+2) and an (n+3)th scan stage ST(n+3). The (m+2)th stage group STG(m+2) may include an (n+4)th scan stage ST(n+4) and an (n+5)th scan stage ST(n+5). Each of the (n−4)th scan stage ST(n−4), the (n−2)th scan stage ST(n−2), the nth scan stage STn, the (n+2)th scan stage ST(n+2), and the (n+4)th scan stage ST(n+4) may be an odd-numbered scan stage. Each of the (n−3)th scan stage ST(n−3), the (n−1)th scan stage ST(n−1), the (n+1)th scan stage ST(n+1), the (n+3)th scan stage ST(n+3), and the (n+5)th scan stage ST(n+5) may be an even-numbered scan stage.

Each of the scan stages ST(n−4) to ST(n+5) may be coupled to first to sixth control lines CS1, CS2, CS3, CS4, CS5, and CS6. Common control signals may be applied to the scan stages ST(n−4) to ST(n+5) through the first to sixth control lines CS1, CS2, CS3, CS4, CS5, and CS6. The first to sixth control lines CS1, CS2, CS3, CS4, CS5, and CS6 are sometimes called the first to sixth control lines CS1 to CS6 for simplicity.

Each of the scan stages ST(n−4) to ST(n+5) may be coupled to corresponding clock lines among scan clock lines SCCK1, SCCK2, SCCK3, SCCK4, SCCK5, and SCCK6, sensing clock lines SSCK1, SSCK2, SSCK3, SSCK4, SSCK5, and SSCK6, and carry clock lines CRCK1, CRCK2, CRCK3, CRCK4, CRCK5, and CRCK6. The scan clock lines SCCK1, SCCK2, SCCK3, SCCK4, SCCK5, and SCCK6, the sensing clock lines SSCK1, SSCK2, SSCK3, SSCK4, SSCK5, and SSCK6, and the carry clock lines CRCK1, CRCK2, CRCK3, CRCK4, CRCK5, and CRCK6 are sometimes called the first to sixth scan clock lines SCCK1 to SCCK6, the first to sixth sensing clock lines SSCK1 to SSCK6, and the first to sixth carry clock lines CRCK1 to CRCK6, respectively, for simplicity.

For example, the (n−4)th scan stage ST(n−4) may be coupled to the first scan clock line SCCK1, the first sensing clock line SSCK1, and the first carry clock line CRCK1. The (n−3)th scan stage ST(n−3) may be coupled to the second scan clock line SCCK2, the second sensing clock line SSCK2, and the second carry clock line CRCK2. The (n−2)th scan stage ST(n−2) may be coupled to the third scan clock line SCCK3, the third sensing clock line SSCK3, and the third carry clock line CRCK3. The (n−1)th scan stage ST(n−1) may be coupled to the fourth scan clock line SCCK4, the fourth sensing clock line SSCK4, and the fourth carry clock line CRCK4. The nth scan stage STn may be coupled to the fifth scan clock line SCCK5, the fifth sensing clock line SSCK5, and the fifth carry clock line CRCK5. The (n+1)th scan stage ST(n+1) may be coupled to the sixth scan clock signal line SCCK6, the sixth sensing clock line SSCK6, and the sixth carry clock line CRCK6.

In addition, iteratively, the (n+2)th scan stage ST(n+2) may be coupled to the first scan clock line SCCK1, the first sensing clock line SSCK1, and the first carry clock line CRCK1. The (n+3)th scan stage ST(n+3) may be coupled to the second scan clock line SCCK2, the second sensing clock line SSCK2, and the second carry clock line CRCK2. The (n+4)th scan stage ST(n+4) may be coupled to the third scan clock line SCCK3, the third sensing clock line SSCK3, and the third carry clock line CRCK3. The (n+5)th scan stage ST(n+5) may be coupled to the fourth scan clock line SCCK4, the fourth sensing clock line SSCK4, and the fourth carry clock line CRCK4.

Input signals for the respective scan stages ST(n−4) to ST(n+5) are applied to the first to sixth control lines CS1 to CS6, the first to sixth scan clock lines SCCK1 to SCCK6, the first to sixth sensing clock lines SSCK1 to SSCK6, and the first to sixth carry clock lines CRCK1 to CRCK6.

Each of the scan stages ST(n−4) to ST(n+5) may be coupled to corresponding lines among the scan lines SC(n−4), SC(n−3), SC(n−2), SC(n−1), SCn, SC(n+1), SC(n+2), SC(n+3), SC(n+4), and SC(n+5), the sensing lines SS(n−4), SS(n−3), SS(n−2), SS(n−1), SSn, SS(n+1), SS(n+2), SS(n+3), SS(n+4), and SS(n+5), and the carry lines CR(n−4), CR(n−3), CR(n−2), CR(n−1), CRn, CR(n+1), CR(n+2), CR(n+3), CR(n+4), and CR(n+5).

For example, the (n−4)th scan stage ST(n−4) may be coupled to the (n−4)th scan line SC(n−4), the (n−4)th sensing line SS(n−4), and the (n−4)th carry line CR(n−4). The (n−3)th scan stage ST(n−3) may be coupled to the (n−3)th scan line SC(n−3), the (n−3)th sensing line SS(n−3), and the (n−3)th carry line CR(n−3). The (n−2)th scan stage ST(n−2) may be coupled to the (n−2)th scan line SC(n−2), the (n−2)th sensing line SS(n−2), and the (n−2)th carry line CR(n−2). The (n−1)th scan stage ST(n−1) may be coupled to the (n−1)th scan line SC(n−1), the (n−1)th sensing line SS(n−1), and the (n−1)th carry line CR(n−1). The nth scan stage STn may be coupled to the nth scan line SCn, the nth sensing line SSn, and the nth carry line CRn. The (n+1)th scan stage ST(n+1) may be coupled to the (n+1)th scan line SC(n+1), the (n+1)th sensing line SS(n+1), and the (n+1)th carry line CR(n+1). The (n+2)th scan stage ST(n+2) may be coupled to the (n+2)th scan line SC(n+2), the (n+2)th sensing line SS(n+2), and the (n+2)th carry line CR(n+2). The (n+3)th scan stage ST(n+3) may be coupled to the (n+3)th scan line SC(n+3), the (n+3)th sensing line SS(n+3), and the (n+3)th carry line CR(n+3). The (n+4)th scan stage ST(n+4) may be coupled to the (n+4)th scan line SC(n+4), the (n+4)th sensing line SS(n+4), and the (n+4)th carry line CR(n+4). The (n+5)th scan stage ST(n+5) may be coupled to the (n+5)th scan line SC(n+5), the (n+5)th sensing line SS(n+5), and the (n+5)th carry line CR(n+5).

Output signals generated by the respective scan stages ST(n−4) to ST(n+5) are applied to the scan lines SC(n−4) to SC(n+5), the sensing lines SS(n−4) to SS(n+5), and the carry lines CR(n−4) to CR(n+5).

Figure 4:
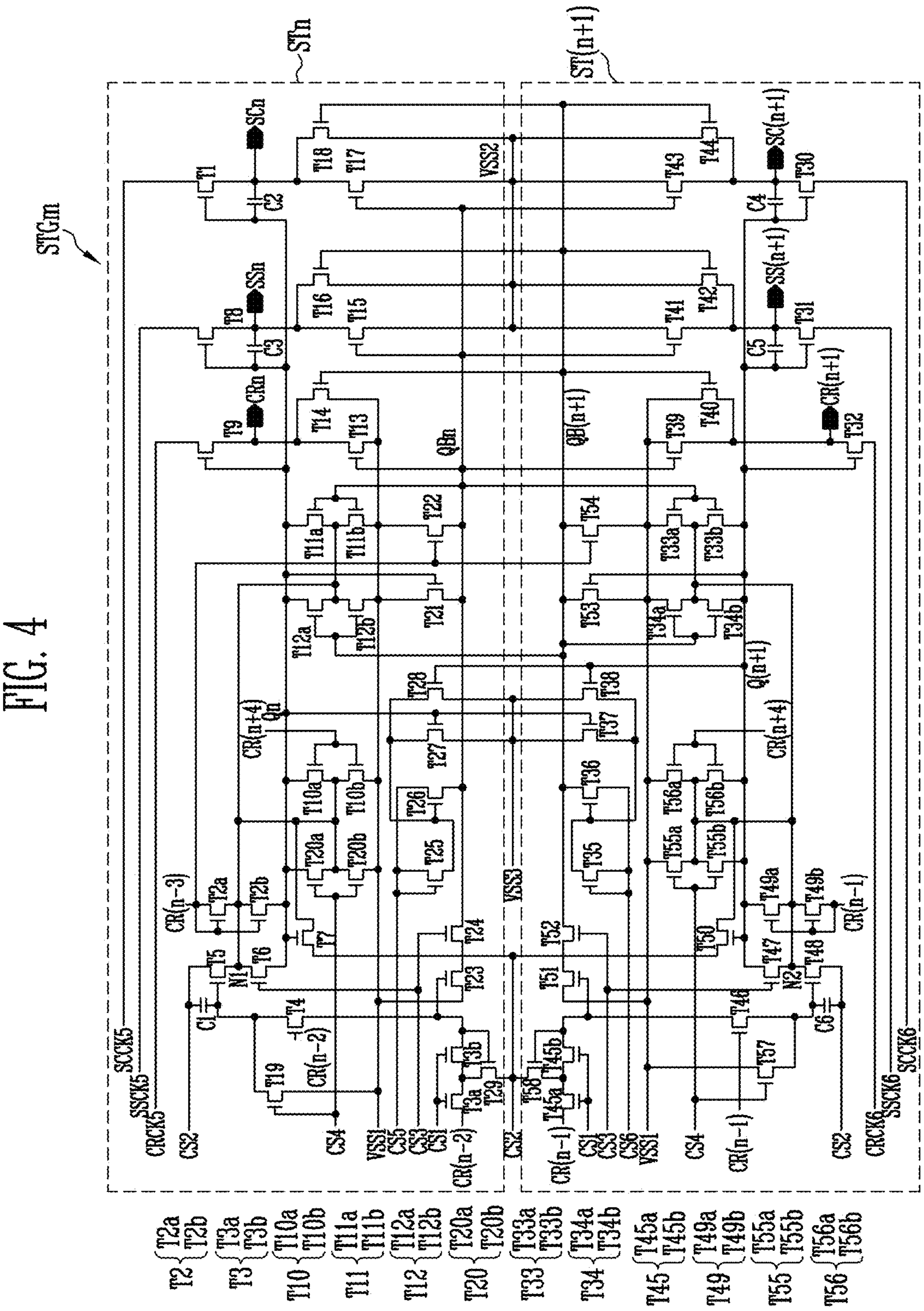
FIG. 4 is a circuit diagram illustrating an mth stage group included in the scan driver shown in FIG. 3 in accordance with an embodiment.

FIG. 4 is a circuit diagram illustrating the mth stage group STGm included in the scan driver 13 shown in FIG. 3 in accordance with an embodiment.

Referring to FIG. 4, the mth stage group STm STGm includes the nth scan stage STn (or first scan stage) and the (n+1)th scan stage ST(n+1) (or second scan stage). Each of the other stage groups STG(m−2), STG(m−1), STG(m+1), and STG(m+2) described with reference to FIG. 3 may include a configuration substantially identical to that of the mth stage group STGm.

First, the nth scan stage STn (or first scan stage) may include transistors T1 to T29 and capacitors C1 to C3. Hereinafter, a case where transistors T1 to T58 are implemented with an N-type transistor, e.g., an NMOS transistor, is assumed and described, but those skilled in the art may implement the mth stage group STGm by replacing some or all of the transistors T1 to T58 with a P-type transistor, e.g., a PMOS transistor.

A gate electrode of a first transistor T1 may be coupled to a first Q node Qn, a first electrode of the first transistor T1 may be coupled to the fifth scan clock line SCCK5, and a second electrode of the first transistor T1 may be coupled to the nth scan line SCn (or first scan line).

A gate electrode and a first electrode of a second transistor T2 may be coupled to an (n−3)th carry line CR(n−3) (or first scan carry line), and a second electrode of the second transistor T2 may be coupled to the first Q node Qn. For example, a carry signal output from the (n−3)th scan stage ST(n−3) may be applied to the (n−3)th carry line CR(n−3).

In an embodiment, the second transistor T2 may include a first sub-transistor T2*a* and a second sub-transistor T2*b*, which are coupled in series. A gate electrode and a first electrode of the first sub-transistor T2*a* may be coupled to the (n−3)th carry line CR(n−3), and a second electrode of the first sub-transistor T2*a* may be coupled to a first node N1. A gate electrode of the second sub-transistor T2*b* may be coupled to the (n−3)th carry line CR(n−3), a first electrode of the second sub-transistor T2*b* may be coupled to the first node N1, and a second electrode of the second sub-transistor T2*b* may be coupled to the first Q node Qn.

A gate electrode of a third transistor T3 may be coupled to a first control line CS1, a first electrode of the third transistor T3 may be coupled to an (n−2)th carry line CR(n−2), or first sensing carry line, and a second electrode of the third transistor T3 may be coupled to a first electrode of a fourth transistor T4. For example, a carry signal output from the (n−2)th scan stage ST(n−2) may be applied to the (n−2)th carry line CR(n−2).

In an embodiment, the third transistor T3 may include a third sub-transistor T3*a* and a fourth sub-transistor T3*b*, which are coupled in series. A gate electrode of the third sub-transistor T3*a* may be coupled to the first control line CS1, a first electrode of the third sub-transistor T3*a* may be coupled to the (n−2)th carry line CR(n−2), and a second electrode of the third sub-transistor T3*a* may be coupled to a first electrode of the fourth sub-transistor T3*b*. A gate electrode of the fourth sub-transistor T3*b* may be coupled to the first control line CS1, the first electrode of the fourth sub-transistor T3*b* may be coupled to the second electrode of the third sub-transistor T3*a*, and a second electrode of the fourth sub-transistor T3*b* may be coupled to the first electrode of the fourth transistor T4.

A gate electrode of the fourth transistor T4 may be coupled to the (n−2)th carry line CR(n−2), the first electrode of the fourth transistor T4 may be coupled to the second electrode of the third transistor T3 (or the fourth sub-transistor T3*b*), and a second electrode of the fourth transistor T4 may be coupled to the second electrode of a first capacitor C1. Meanwhile, although a case where the gate electrode of the fourth transistor T4 is coupled to the (n−2)th carry line CR(n−2) is illustrated in FIG. 4, in an embodiment, the gate electrode of the fourth transistor T4 may be coupled to the second electrode of the third transistor T3.

A gate electrode of a fifth transistor T5 may be coupled to the second electrode of the fourth transistor T4, a first electrode of the fifth transistor T5 may be coupled to a second control line CS2, and a second electrode of the fifth transistor T5 may be coupled to the first node N1.

A first electrode of the first capacitor C1 may be coupled to the first electrode of the fifth transistor T5, and the second electrode of the first capacitor C1 may be coupled to the gate electrode of the fifth transistor T5.

A gate electrode of a sixth transistor T6 may be coupled to a third control line CS3, a first electrode of the sixth transistor T6 may be coupled to the first node N1, and a second electrode of the sixth transistor T6 may be coupled to the first Q node Qn.

A gate electrode of a seventh transistor T7 may be coupled to the first Q node Qn, a first electrode of the seventh transistor T7 may be coupled to the second control line CS2, and a second electrode of the seventh transistor T7 may be coupled to the first node N1.

A first electrode of a second capacitor C2 may be coupled to the gate electrode of the first transistor T1, and a second electrode of the second capacitor C2 may be coupled to the second electrode of the first transistor T1.

A gate electrode of an eighth transistor T8 may be coupled to the first Q node Qn, a first electrode of the eighth transistor T8 may be coupled to a fifth sensing clock line SSCK5, and a second electrode of the eighth transistor T8 may be coupled to an nth sensing line SSn, or first sensing line.

A first electrode of a third capacitor C3 may be coupled to the gate electrode of the eighth transistor T8, and a second electrode of the third capacitor C3 may be coupled to the second electrode of the eighth transistor T8.

A gate electrode of a ninth transistor T9 may be coupled to the first Q node Qn, a first electrode of the ninth transistor T9 may be coupled to a fifth carry clock line CRCK5, and a second electrode of the ninth transistor T9 may be coupled to an nth carry line CRn (or first carry line).

A gate electrode of a tenth transistor T10 may be coupled to an (n+4)th carry line CR(n+4) (or reset carry line), a first electrode of the tenth transistor T10 may be coupled to the first Q node Qn, and a second electrode of the tenth transistor T10 may be coupled to a first power line VSS1. For example, a carry signal output from the (n+4)th scan stage ST(n+4) may be applied to the (n+4)th carry line CR(n+4).

In an embodiment, the tenth transistor T10 may include a fifth sub-transistor T10*a* and a sixth sub-transistor T10*b*, which are coupled in series. A gate electrode of the fifth sub-transistor T10*a* may be coupled to the (n+4)th carry line CR(n+4), a first electrode of the fifth sub-transistor T10*a* may be coupled to the first Q node Qn, and a second electrode of the fifth sub-transistor T10*a* may be coupled to the first node N1. A gate electrode of the sixth sub-transistor T10*b* may be coupled to the (n+4)th carry line CR(n+4), a first electrode of the sixth sub-transistor T10*b* may be coupled to the first node N1, and a second electrode of the sixth sub-transistor T10*b* may be coupled to the first power line VSS1.

A gate electrode of an eleventh transistor T11 may be coupled to a first QB node QBn, a first electrode of the eleventh transistor T11 may be coupled to the first Q node Qn, and a second electrode of the eleventh transistor T11 may be coupled to the first power line VSS1.

In an embodiment, the eleventh transistor T11 may include a seventh sub-transistor T11*a* and an eighth sub-transistor T11*b*, which are coupled in series. A gate electrode of the seventh sub-transistor T11*a* may be coupled to the first QB node QBn, a first electrode of the seventh sub-transistor T11*a* may be coupled to the first Q node Qn, and a second electrode of the seventh sub-transistor T11*a* may be coupled to the first node N1. A gate electrode of the eighth sub-transistor T11*b* may be coupled to the first QB node QBn, a first electrode of the eighth sub-transistor T11*b* may be coupled to the first node N1, and a second electrode of the eighth sub-transistor T11*b* may be coupled to the first power line VSS1.

A gate electrode of a twelfth transistor T12 may be coupled to a second QB node QB(n+1), a first electrode of the twelfth transistor T12 may be coupled to the first Q node Qn, and a second electrode of the twelfth transistor T12 may be coupled to the first power line VSS1.

In an embodiment, the twelfth transistor T12 may include a ninth sub-transistor T12*a* and a tenth sub-transistor T12*b*, which are coupled in series. A gate electrode of the ninth sub-transistor T12*a* may be coupled to the second QB node QB(n+1), a first electrode of the ninth sub-transistor T12*a* may be coupled to the first Q node Qn, and a second electrode of the ninth sub-transistor T12*a* may be coupled to the first node N1. A gate electrode of the tenth sub-transistor T12*b* may be coupled to the second QB node QB(n+1), a first electrode of the tenth sub-transistor T12*b* may be coupled to the first node N1, and a second electrode of the tenth sub-transistor T12*b* may be coupled to the first power line VSS1.

A gate electrode of a thirteenth transistor T13 may be coupled to the first QB node QBn, a first electrode of the thirteenth transistor T13 may be coupled to the nth carry line CRn, and a second electrode of the thirteenth transistor T13 may be coupled to the first power line VSS1.

A gate electrode of a fourteenth transistor T14 may be coupled to the second QB node QB(n+1), a first electrode of the fourteenth transistor T14 may be coupled to the nth carry line CRn, and a second electrode of the fourteenth transistor T14 may be coupled to the first power line VSS1.

A gate electrode of a fifteenth transistor T15 may be coupled to the first QB node QBn, a first electrode of the fifteenth transistor T15 may be coupled to the nth sensing line SSn, and a second electrode of the fifteenth transistor T15 may be coupled to a second power line VSS2.

A gate electrode of a sixteenth transistor T16 may be coupled to the second QB node QB(n+1), a first electrode of the sixteenth transistor T16 may be coupled to the nth sensing line SSn, and a second electrode of the sixteenth transistor T16 may be coupled to the second power line VSS2.

A gate electrode of a seventeenth transistor T17 may be coupled to the first QB node QBn, a first electrode of the seventeenth transistor T17 may be coupled to the nth scan line SCn, and a second electrode of the seventeenth transistor T17 may be coupled to the second power line VSS2.

A gate electrode of an eighteenth transistor T18 may be coupled to the second QB node QB(n+1), a first electrode of the eighteenth transistor T18 may be coupled to the nth scan line SCn, and a second electrode of the eighteenth transistor T18 may be coupled to the second power line VSS2.

A gate electrode of a nineteenth transistor T19 may be coupled to a fourth control line CS4, a first electrode of the nineteenth transistor T19 may be coupled to the gate electrode of the fifth transistor T5 (and the second electrode of the first capacitor C1), and a second electrode of the nineteenth transistor T19 may be coupled to the first power line VSS1.

A gate electrode of the twentieth transistor T20 may be coupled to the fourth control line CS4, a first electrode of the twentieth transistor T20 may be coupled to the first Q node Qn, and a second electrode of the twentieth transistor T20 may be coupled to the first power line VSS1.

In an embodiment, the twentieth transistor T20 may include an eleventh sub-transistor T20*a* and a twelfth sub-transistor T20*b*, which are coupled in series. A gate electrode of the eleventh sub-transistor T20*a* may be coupled to the fourth control line CS4, a first electrode of the eleventh sub-transistor T20*a* may be coupled to the first Q node Qn, and a second electrode of the eleventh sub-transistor T20 may be coupled to the first node N1. A gate electrode of the twelfth sub-transistor T20*b* may be coupled to the fourth control line CS4, a first electrode of the twelfth sub-transistor T20*b* may be coupled to the first node N1, and a second electrode of the twelfth sub-transistor T20*b* may be coupled to the first power line VSS1.

A gate electrode of a twenty-first transistor T21 may be coupled to the first Q node Qn, a first electrode of the twenty-first transistor T21 may be coupled to the first power line VSS1, and a second electrode of the twenty-first transistor T21 may be coupled to the first QB node QBn.

A gate electrode of a twenty-second transistor T22 may be coupled to the (n−3)th carry line CR(n−3) (or scan carry line), a first electrode of the twenty-second transistor T22 may be coupled to the first power line VSS1, and a second electrode of the twenty-second transistor T22 may be coupled to the first QB node QBn.

A gate electrode of a twenty-third transistor T23 may be coupled to the second electrode of the third transistor T3, a first electrode of the twenty-third transistor T23 may be coupled to the first power line VSS1, and a second electrode of the twenty-third transistor T23 may be coupled to a first electrode of a twenty-fourth transistor T24.

A gate electrode of the twenty-fourth transistor T24 may be coupled to the third control line CS3, a first electrode of the twenty-fourth transistor T24 may be coupled to the second electrode of the twenty-third transistor T23, and a second electrode of the twenty-fourth transistor T24 may be coupled to the first QB node QBn.

A gate electrode and a first electrode of a twenty-fifth transistor T25 may be coupled to a fifth control line CS5, and a second electrode of the twenty-fifth transistor T25 may be coupled to a gate electrode of a twenty-sixth transistor T26.

The gate electrode of the twenty-sixth transistor T26 may be coupled to the second electrode of the twenty-fifth transistor T25, a first electrode of the twenty-sixth transistor T26 may be coupled to the fifth control line CS5, and a second electrode of the twenty-sixth transistor T26 may be coupled to the first QB node QBn.

A gate electrode of a twenty-seventh transistor T27 may be coupled to the first Q node Qn, a first electrode of the twenty-seventh transistor T27 may be coupled to the gate electrode of the twenty-sixth transistor T26, and a second electrode of the twenty-seventh transistor T27 may be coupled to a third power line VSS3.

A gate electrode of a twenty-eighth transistor T28 may be coupled to a second Q node Q(n+1), a first electrode of the twenty-eighth transistor T28 may be coupled to the gate electrode of the twenty-sixth transistor T26, and a second electrode of the twenty-eighth transistor T28 may be coupled to the third power line VSS3.

A gate electrode of a twenty-ninth transistor T29 may be coupled to the second electrode of the fourth sub-transistor T3*b*, a first electrode of the twenty-ninth transistor T29 may be coupled to the first electrode of the fourth sub-transistor T3*b*, and a second electrode of the twenty-ninth transistor T29 may be coupled to the second control line CS2.

Next, the (n+1)th scan stage ST(n+1) (or second scan stage) may include transistors T30 to T58 and capacitors C4 to C6.

A gate electrode of a thirtieth transistor T30 may be coupled to the second Q node Q(n+1), a first electrode of the thirtieth transistor T30 may be coupled to an (n+1)th scan line SC(n+1) (or second scan line), and a second electrode of the thirtieth transistor T30 may be coupled to a sixth scan clock line SCCK6.

A first electrode of a fourth capacitor C4 may be coupled to the gate electrode of the thirtieth transistor T30, and a second electrode of the fourth capacitor C4 may be coupled to the first electrode of the thirtieth transistor T30. The fourth capacitor C4 may couple the gate electrode and the first electrode of the thirtieth transistor T30 to each other.

A gate electrode of a thirty-first transistor T31 may be coupled to the second Q node Q(n+1), a first electrode of the thirty-first transistor T31 may be coupled to an (n+1)th sensing line SS(n+1) (or second sensing line), and a second electrode of the thirty-first transistor T31 may be coupled to the sixth sensing clock line SSCK6.

A first electrode of a fifth capacitor C5 may be coupled to the gate electrode of the thirty-first transistor T31, and a second electrode of the fifth capacitor C5 may be coupled to the first electrode of the thirty-first transistor T31. The fifth capacitor C5 may couple the gate electrode and the first electrode of the thirty-first transistor T31 to each other.

A gate electrode of a thirty-second transistor T32 may be coupled to the second Q node Q(n+1), a first electrode of the thirty-second transistor T32 may be coupled to an (n+1)th carry line CR(n+1) (or second carry line), and a second electrode of the thirty-second transistor T32 may be coupled to a sixth carry clock line CRCK6.

A gate electrode of a thirty-third transistor T33 may be coupled to the first QB node QBn, a first electrode of the thirty-third transistor T33 may be coupled to the first power line VSS1, and a second electrode of the thirty-third transistor T33 may be coupled to the second Q node Q(n+1).

In an embodiment, the thirty-third transistor T33 may include a thirteenth sub-transistor T33*a* and a fourteenth sub-transistor T33*b*, which are coupled in series. A gate electrode of the thirteenth sub-transistor T33*a* may be coupled to the first QB node QBn, a first electrode of the thirteenth sub-transistor T33*a* may be coupled to the first power line VSS1, and a second electrode of the thirteenth sub-transistor T33*a* may be coupled to a second node N2. A gate electrode of the fourteenth sub-transistor T33*b* may be coupled to the first QB node QBn, a first electrode of the fourteenth sub-transistor T33*b* may be coupled to the second node N2, and a second electrode of the fourteenth sub-transistor T33*b* may be coupled to the second Q node Q(n+1).

A gate electrode of a thirty-fourth transistor T34 may be coupled to the second QB node QB(n+1), a first electrode of the thirty-fourth transistor T34 may be coupled to the first power line VSS1, and a second electrode of the thirty-fourth transistor T34 may be coupled to the second Q node Q(n+1).

In an embodiment, the thirty-fourth transistor T34 may include a fifteenth sub-transistor T34*a* and a sixteenth sub-transistor T34*b*, which are coupled in series. A gate electrode of the fifteenth sub-transistor T34*a* may be coupled to the second QB node QB(n+1), a first electrode of the fifteenth sub-transistor T34*a* may be coupled to the first power line VSS1, and a second electrode of the fifteenth sub-transistor T34*a* may be coupled to the second node N2. A gate electrode of the sixteenth sub-transistor T34*b* may be coupled to the second QB node QB(n+1), a first electrode of the sixteenth sub-transistor T34*b* may be coupled to the second node N2, and a second electrode of the sixteenth sub-transistor T34*b* may be coupled to the second Q node Q(n+1).

A gate electrode of the thirty-fifth transistor T35 may be coupled to a sixth control line CS6, a first electrode of the thirty-fifth transistor T35 may be coupled to a gate electrode of a thirty-sixth transistor T36, and a second electrode of the thirty-fifth transistor T35 may be coupled to the sixth control line CS6.

The gate electrode of the thirty-sixth transistor T36 may be coupled to the first electrode of the thirty-fifth transistor T35, a first electrode of the thirty-sixth transistor T36 may be coupled to the second QB node QB(n+1), and a second electrode of the thirty-sixth transistor T36 may be coupled to the sixth control line CS6.

A gate electrode of a thirty-seventh transistor T37 may be coupled to the first Q node Qn, a first electrode of the thirty-seventh transistor T37 may be coupled to the third power line VSS3, and a second electrode of the thirty-seventh transistor T37 may be coupled to the gate electrode of the thirty-sixth transistor T36.

A gate electrode of a thirty-eighth transistor T38 may be coupled to the second Q node Q(n+1), a first electrode of the thirty-eighth transistor T38 may be coupled to the third power line VSS3, and a second electrode of the thirty-eighth transistor T38 may be coupled to the gate electrode of the thirty-sixth transistor T36.

A gate electrode of a thirty-ninth transistor T39 may be coupled to the first QB node QBn, a first electrode of the thirty-ninth transistor T39 may be coupled to the first power line VSS1, and a second electrode of the thirty-ninth transistor T39 may be coupled to the (n+1)th carry line CR(n+1).

A gate electrode of a fortieth transistor T40 may be coupled to the second QB node QB(n+1), a first electrode of the fortieth transistor T40 may be coupled to the first power line VSS1, and a second electrode of the fortieth transistor T40 may be coupled to the (n+1)th carry line CR(n+1).

A gate electrode of a forty-first transistor T41 may be coupled to the first QB node QBn, a first electrode of the forty-first transistor T41 may be coupled to the second power line VSS2, and a second electrode of the forty-first transistor T41 may be coupled to the (n+1)th sensing line SS(n+1).

A gate electrode of a forty-second transistor T42 may be coupled to the second QB node QB(n+1), a first electrode of the forty-second transistor T42 may be coupled to the second power line VSS2, and a second electrode of the forty-second transistor T42 may be coupled to the (n+1)th sensing line SS(n+1).

A gate electrode of a forty-third transistor T43 may be coupled to the first QB node QBn, a first electrode of the forty-third transistor T43 may be coupled to the second power line VSS2, and a second electrode of the forty-third transistor T43 may be coupled to the (n+1)th scan line SC(n+1).

A gate electrode of a forty-fourth transistor T44 may be coupled to the second QB node QB(n+1), a first electrode of the forty-fourth transistor T44 may be coupled to the second power line VSS2, and a second electrode of the forty-fourth transistor T44 may be coupled to the (n+1)th scan line SC(n+1).

A gate electrode of a forty-fifth transistor T45 may be coupled to the first control line CS1, a first electrode of the forty-fifth transistor T45 may be coupled to an (n−1)th carry line CR(n−1) (or second scan carry line), and a second electrode of the forty-fifth transistor T45 may be coupled to a first electrode of a forty-sixth transistor T46. For example, a carry signal output from the (n−1)th scan stage ST(n−1) may be applied to the (n−1)th carry line CR(n−1).

In an embodiment, the forty-fifth transistor T45 may include a seventeenth sub-transistor T45*a* and an eighteenth sub-transistor T45*b*, which are coupled in series. A gate electrode of the seventeenth sub-transistor T45*a* may be coupled to the first control line CS1, a first electrode of the seventeenth sub-transistor T45*a* may be coupled to the (n−1)th carry line CR(n−1), and a second electrode of the seventeenth sub-transistor T45*a* may be coupled to a first electrode of the eighteenth sub-transistor T45*b*. A gate electrode of the eighteenth sub-transistor T45*b* may be coupled to the first control line CS1, the first electrode of the eighteenth sub-transistor T45*b* may be coupled to the second electrode of the seventeenth sub-transistor T45*a*, and a second electrode of the eighteenth sub-transistor T45*b* may be coupled to the first electrode of the forty-sixth transistor T46.

A gate electrode of the forty-sixth transistor T46 may be coupled to the (n−1)th carry line CR(n−1), the first electrode of the forty-sixth transistor T46 may be coupled to the second electrode of the forty-fifth transistor T45 (and the eighteenth sub-transistor T45*b*), and a second electrode of the forty-sixth transistor T46 may be coupled to a second electrode of a sixth capacitor C6 (and a gate electrode of a forty-eighth transistor T48).

A gate electrode of a forty-seventh transistor T47 may be coupled to the third control line CS3, a first electrode of the forty-seventh transistor T47 may be coupled to the second Q node Q(n+1), and a second electrode of the forty-seventh transistor T47 may be coupled to the second node N2.

The gate electrode of the forty-eighth transistor T48 may be coupled to the second electrode of the forty-sixth transistor T46, a first electrode of the forty-eighth transistor T48 may be coupled to the second node N2, and a second electrode of the forty-eighth transistor T48 may be coupled to the second control line CS2.

A first electrode of the sixth capacitor C6 may be coupled to the gate electrode of the forty-eighth transistor T48, and the second electrode of the sixth capacitor C6 may be coupled to the second electrode of the forty-eighth transistor T48.

A first electrode of a forty-ninth transistor T49 may be coupled to the second Q node Q(n+1), and a gate electrode and a second electrode of the forty-ninth transistor T49 may be coupled to the (n−1)th carry line CR(n−1). The carry signal output from the (n−1)th scan stage ST(n−1) may be applied to the (n−1)th carry line CR(n−1).

In an embodiment, the forty-ninth transistor T49 may include a nineteenth sub-transistor T49*a* and a twentieth sub-transistor T49*b*, which are coupled in series. A gate electrode of the nineteenth sub-transistor T49*a* may be coupled to the (n−1)th carry line CR(n−1), a first electrode of the nineteenth sub-transistor T49*a* may be coupled to the second Q node Q(n+1), and a second electrode of the nineteenth sub-transistor T49*a* may be coupled to the second node N2. A gate electrode of the twentieth sub-transistor T49*b* may be coupled to the (n−1)th carry line CR(n−1), a first electrode of the twentieth sub-transistor T49*b* may be coupled to the second node N2, and a second electrode of the twentieth sub-transistor T49*b* may be coupled to the (n−1)th carry line CR(n−1).

A gate electrode of a fiftieth transistor T50 may be coupled to the second Q node Q(n+1), a first electrode of the fiftieth transistor T50 may be coupled to the second control line CS2, and a second electrode of the fiftieth transistor T50 may be coupled to the second node N2.

A gate electrode of a fifty-first transistor T51 may be coupled to the second electrode of the forty-fifth transistor T45 (and the eighteenth sub-transistor T45*b*), a first electrode of the fifty-first transistor T51 may be coupled to the first power line VSS1, and a second electrode of the fifty-first transistor T51 may be coupled to a first electrode of a fifty-second transistor T52.

A gate electrode of the fifty-second transistor T52 may be coupled to the third control line CS3, the first electrode of the fifty-second transistor T52 may be coupled to the second electrode of the fifty-first transistor T51, and a second electrode of the fifty-second transistor T52 may be coupled to the second QB node QB(n+1).

A gate electrode of a fifty-third transistor T53 may be coupled second Q node Q(n+1), a first electrode of the fifty-third transistor T53 may be coupled to the second QB node QB(n+1), and a second electrode of the fifty-third transistor T53 may be coupled to the first power line VSS1.

A gate electrode of a fifty-fourth transistor T54 may be coupled to the (n−3)th carry line CR(n−3), a first electrode of the fifty-fourth transistor T54 may be coupled to the second QB node QB(n+1), and a second electrode of the fifty-fourth transistor T54 may be coupled to the first power line VSS1.

A gate electrode of a fifty-fifth transistor T55 may be coupled to the fourth control line CS4, a first electrode of the fifty-fifth transistor T55 may be coupled to the first power line VSS1, and a second electrode of the fifty-fifth transistor T55 may be coupled to the second Q node Q(n+1).

In an embodiment, the fifty-fifth transistor T55 may include a twenty-first sub-transistor T55*a* and a twenty-second sub-transistor T55*b*, which are coupled in series. A gate electrode of the twenty-first sub-transistor T55*a* may be coupled to the fourth control line CS4, a first electrode of the twenty-first sub-transistor T55*a* may be coupled to the first power line VSS1, and a second electrode of the twenty-first sub-transistor T55*a* may be coupled to the second node N2. A gate electrode of the twenty-second sub-transistor T55*b* may be coupled to the fourth control line CS4, a first electrode of the twenty-second sub-transistor T55*b* may be coupled to the second node N2, and a second electrode of the twenty-second sub-transistor T55*b* may be coupled to the second Q node Q(n+1).

A gate electrode of a fifty-sixth transistor T56 may be coupled to the first reset carry line CR(n+4) (or (n+4)th carry line), a first electrode of the fifty-sixth transistor T56*b* may be coupled to the first power line VSS1, and a second electrode of the fifty-sixth transistor T56 may be coupled to the second Q node Q(n+1).

In an embodiment, the fifty-sixth transistor T56 may include a twenty-third sub-transistor T56*a* and a twenty-fourth sub-transistor T56*b*, which are coupled in series. A gate electrode of the twenty-third sub-transistor T56*a* may be coupled to the first reset carry line CR(n+4), a first electrode of the twenty-third sub-transistor T56*a* may be coupled to the first power line VSS1, and a second electrode of the twenty-third sub-transistor T56*a* may be coupled to the second node N2. A gate electrode of the twenty-fourth sub-transistor T56*b* may be coupled to the first reset carry line CR(n+4), a first electrode of the twenty-fourth sub-transistor T56*b* may be coupled to the second node N2, and a second electrode of the twenty-fourth sub-transistor T56*b* may be coupled to the second Q node Q(n+1).

A gate electrode of a fifty-seventh transistor T57 may be coupled to the fourth control line CS4, a first electrode of the fifty-seventh transistor T57 may be coupled to the first power line VSS1, and a second electrode of the fifty-seventh transistor T57 may be coupled to the second electrode of the forty-sixth transistor T46.

A gate electrode of a fifty-eighth transistor T58 may be coupled to the second electrode of the eighteenth sub-transistor T45*b*, a first electrode of the fifty-eighth transistor T58 may be coupled to the second control line CS2, and a second electrode of the fifty-eighth transistor T58 may be coupled to the first electrode of the eighteenth sub-transistor T45*b*.

Figure 6:
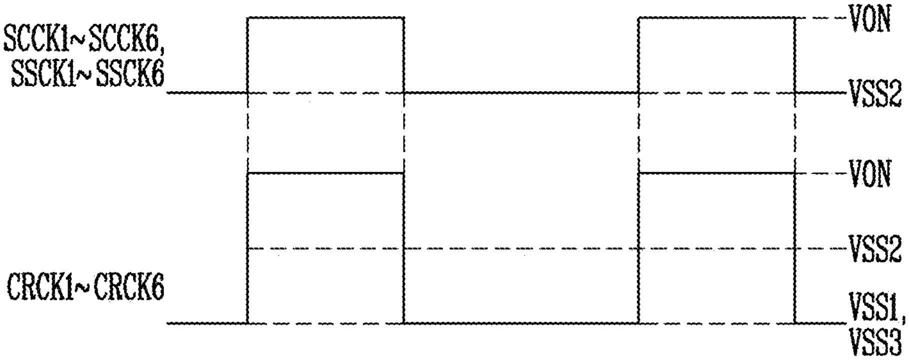
FIG. 6 is a waveform diagram illustrating clock signals in accordance with an embodiment.

FIG. 5 is a waveform diagram illustrating a driving method of the scan driver shown in FIG. 3 in a display period in accordance with an embodiment. FIG. 6 is a waveform diagram illustrating clock signals in accordance with an embodiment.

First, referring to FIGS. 3 to 5, signals are illustrated, which are applied to the first to fourth control lines CS1, CS2, CS3, and CS4, the scan clock lines SCCK1 to SCCK6, the sensing clock lines SSCK1 to SSCK6, the carry clock lines CRCK1 to CRCK6, the (n−3)th carry line CR(n−3) (or first scan carry line), the (n−2)th carry line CR(n−2) (or first sensing carry line), the nth scan line SCn (or first scan line), the (n+1)th scan line SC(n+1) (or second scan line), the nth sensing line SSn (or first sensing line), the (n+1)th sensing line SS(n+1) (or (n+1)th sensing line), the nth carry line CRn (or first carry line), and the (n+1)th carry line CR(n+1) (or second carry line).

In the display period, a scan clock signal, a sensing clock signal, and a carry clock signal, which are respectively applied to a scan clock line, a sensing clock line, and a carry clock line, which are coupled to the same scan stage, may have the same phase. Thus, in FIG. 5, a signal of the first clock lines SCCK1, SSCK1, and CRCK1 is commonly illustrated. A signal of the second clock lines SCCK2, SSCK2, and CRCK2 is commonly illustrated. A signal of the third clock lines SCCK3, SSCK3, and CRCK3 is commonly illustrated. A signal of the fourth clock lines SCCK4, SSCK4, and CRCK4 is commonly illustrated. A signal of the fifth clock lines SCCK5, SSCK5, and CRCK5 is commonly illustrated. A signal of the sixth clock lines SCCK6, SSCK6, and CRCK6 is commonly illustrated.

However, as shown in FIG. 6, the scan clock signal, the sensing clock signal, and the carry clock signal, which are respectively applied to the scan clock line, the sensing clock line, and the carry clock line, which are coupled to the same scan stage, may have different magnitudes. For example, a low level (or logic low level) of the scan clock signals and the sensing clock signals may correspond to the magnitude of a voltage applied to the second power line VSS2, and a high level (or logic high level) of the scan clock signals and the sensing clock signals may correspond to the magnitude of a turn-on voltage VON. In addition, a low level of the carry clock signals may correspond to the magnitude of a voltage applied to the first power line VSS1 or the third power line VSS3, and a high level of the carry clock signals may correspond to the magnitude of the turn-on voltage VON. For example, the voltage applied to the second power line VSS2 may be higher than that applied to the first power line VSS1 or the third power line VSS3.

The magnitude of the turn-on voltage VON may be a magnitude sufficient enough to turn on the transistors, and the magnitude of each of the voltages applied to the power lines VSS1, VSS2, and VSS3 may have a magnitude sufficient enough to turn off the transistors. Hereinafter, a voltage level corresponding to the magnitude of the turn-on voltage VON may be expressed as the high level, and a voltage level corresponding to the magnitude of each of the voltages applied to the power lines VSS1, VSS2, and VSS3 may be expressed as the low level.

Referring back to FIG. 5, high-level pulses of the second clock lines SCCK2, SSCK2, and CRCK2 have a phase delayed from those of the first clock lines SCCK1, SSCK1, and CRCK1, and the high-level pulses of the second clock lines SCCK2, SSCK2, and CRCK2 and the high-level pulses of the first clock lines SCCK1, SSCK1, and CRCK1 may temporally partially overlap with each other. For example, the high-level pulses may have a length (or width) of two horizontal periods, and the overlapping length may correspond to one horizontal period. For example, high-level pulses of the second clock lines SCCK2, SSCK2, and CRCK2 may be delayed by one horizontal period from the high-level pulses of the first clock line SCCK1, SSCK1, and CRCK1.

Similarly, high-level pulses of the third clock lines SCCK3, SSCK3, and CRCK3 have a phase delayed from those of the second clock lines SCCK2, SSCK2, and CRCK2, and the high-level pulses of the third clock lines SCCK3, SSCK3, and CRCK3 and the high-level pulses of the second clock lines SCCK2, SSCK2, and CRCK2 may temporally partially overlap with each other. High-level pulses of the fourth clock lines SCCK4, SSCK4, and CRCK4 have a phase delayed from those of the third clock lines SCCK3, SSCK3, and CRCK3, and the high-level pulses of the fourth clock lines SCCK4, SSCK4, and CRCK4 and the high-level pulses of the third clock lines SCCK3, SSCK3, and CRCK3 may temporally partially overlap with each other. High-level pulses of the fifth clock lines SCCK5, SSCK5, and CRCK5 have a phase delayed from those of the fourth clock lines SCCK4, SSCK4, and CRCK4, and the high-level pulses of the fifth clock lines SCCK5, SSCK5, and CRCK5 and the high-level pulses of the fourth clock lines SCCK4, SSCK4, and CRCK4 may temporally partially overlap with each other. High-level pulses of the sixth clock lines SCCK6, SSCK6, and CRCK6 have a phase delayed from those of the fifth clock lines SCCK5, SSCK5, and CRCK5, and the high-level pulses of the sixth clock lines SCCK6, SSCK6, and CRCK6 and the high-level pulses of the fifth clock lines SCCK5, SSCK5, and CRCK5 may temporally partially overlap with each other. In addition, iteratively, the high-level pulses of the first clock lines SCCK1, SSCK1, and CRCK1 have a phase delayed from those of the sixth clock lines SCCK6, SSCK6, and CRCK6, and the high-level pulses of the first clock lines SCCK1, SSCK1, and CRCK1 and the high-level pulses of the sixth clock lines SCCK6, SSCK6, and CRCK6 may temporally partially overlap with each other.

Hereinafter, an operation of the nth scan stage STn in the display period will be described. Operations of the other scan stages are similar to that of the nth scan stage STn, and thus, overlapping descriptions will be omitted.

At a first time TP1, a high-level pulse may be applied to the fourth control line CS4. Accordingly, the twentieth transistor T20 may be turned on, and the first Q node Qn may be discharged to the low level. In addition, the nineteenth transistor T19 may be turned on, and the first capacitor C1 may be discharged. For example, a voltage charged in the first capacitor C1 and the gate electrode of the fifth transistor T5 may be reset.

At a second time TP2, a high-level pulse may be generated in the (n−3)th carry line CR(n−3). Accordingly, the second transistor T2 may be turned on, and the first Q node Qn may be charged to the high level. The seventh transistor T7 may be turned on in response to a node voltage of the first Q node Qn, and the first node N1 may be charged to the high level applied to the second control line CS2.

At a third time TP3, a high-level pulse (or first pulse) may be generated in the first control line CS1. Accordingly, the third transistor T3 may be turned on.

Also, at the third time TP3, a high-level pulse may be generated in the (n−2)th carry line CR(n−2). Accordingly, the fourth transistor T4 may be turned on. A high-level voltage may be charged in the second electrode of the first capacitor C1 through the turned-on third transistor T3 and the turned-on fourth transistor T4. That is, when the high-level pulse is generated in the first control line CS1, a high-level voltage may be charged in only the first capacitor C1 of the nth scan stage STn in which the high-level pulse is generated in the (n−2)th carry line CR(n−2), and the nth scan stage STn may be selected as one of stages to operate in a sensing period which will be described later.

At a fourth time TP4, a high-level pulse may be generated in the fifth clock lines SCCK5, SSCK5, and CRCK5. Accordingly, a voltage of the first Q node Qn may be boosted higher than the high level by the second and third capacitors C2 and C3, and a high-level pulse may be output to the nth scan line SCn, the nth sensing line SSn, and the nth carry line CRn.

Meanwhile, although the voltage of the first Q node Qn is boosted, a high-level voltage is applied to the first node N1, and accordingly, voltage differences between drain and source electrodes of the transistors T5, T2*b*, T20*a*, T10*a*, T12*a*, and T11*a* are not relatively large. Thus, degradation of the transistors T5, T2*b*, T20*a*, T10*a*, T12*a*, and T11*a* can be prevented.

At a fifth time TP5, when a high-level pulse is generated in the sixth clock lines SCCK6, SSCK6, and CRCK6, a high-level pulse is output to the (n+1)th scan line SC(n+1), the (n+1)th sensing line SS(n+1), and the (n+1)th carry line CR(n+1) from the (n+1)th scan stage ST(n+1), like the operation of the nth scan stage STn.

At a sixth time TP6, a high-level pulse may be generated in the first reset carry line CR(n+4). Accordingly, the first Q node Qn may be coupled to the first power line VSS1 through the tenth transistor T10, and be discharged to the low level.

At a seventh time TP7, a high-level pulse (or second pulse) may be generated in the first control line CS1. Accordingly, the third transistor T3 may be turned on.

However, at the seventh time TP7, since a low-level signal is applied to the (n−2)th carry line CR(n−2), the fourth transistor T4 may be turned off or maintain a turn-off state. The low-level signal of the (n−2)th carry line CR(n−2) is not transferred to the second electrode of the first capacitor C1, and the high-level voltage charged in the second electrode of the first capacitor C1 at the third time TP3 may be maintained.

In a stage in which the fourth transistor T4 is not provided, the third transistor T3 may be turned on, the low-level signal of the (n−2)th carry line CR(n−2) may be transferred to the second electrode of the first capacitor C1, and the second electrode of the first capacitor C1 may be discharged to the low level or be reset at the seventh time TP7. That is, the stage in which the fourth transistor T4 is not provided may not be selected as a stage to operate in the sensing period.

Meanwhile, at the seventh time TP7, a high-level pulse may be generated in the (n+5)th carry line CR(n+5). Accordingly, a high-level voltage may be charged in the first capacitor C1 of a scan stage (e.g., an (n+7)th scan stage that is a seventh scan stage from the nth scan stage STn), which uses the (n+5)th carry line CR(n+5) as the first sensing carry line, and the scan stage along with the nth scan stage STn may be selected as one of stages to operate in the sensing period.

In an embodiment, a high-level control signal may be alternately applied to the fifth control line CS5 and the sixth control line CS6 in a specific period unit. The specific period unit may correspond to, for example, frame intervals. The control signal applied to the fifth control line CS5 and the sixth control line CS6 will be described with reference to FIG. 7.

FIG. 7 is a diagram illustrating control signals applied to the scan driver in accordance with an embodiment.

Referring to FIG. 7, each frame intervals FRAM1 and FRAM2 (or frames) may include a display period P_DISP and a sensing period P_BLANK. A signal of the first control line CS1, a signal of the second control line CS2, a signal of the third control line CS3, and a signal of the fourth control line CS4 in the display period P_DISP may be respectively substantially identical to the signal of the first control line CS1, the signal of the second control line CS2, the signal of the third control line CS3, and the signal of the fourth control line CS4, which are described with reference to FIG. 5, and thus, overlapping descriptions will be omitted. Meanwhile, a signal of the first control line CS1, a signal of the second control line CS2, a signal of the third control line CS3, and a signal of the fourth control line CS4 in the sensing period P_BLANK will be described later with reference to FIG. 8.

During a first frame interval FRAME1, a high-level control signal may be applied to the fifth control line CS5, and a low-level control signal may be applied to the sixth control line CS6. The twenty-fifth and twenty-sixth transistors T25 and T26 may be turned on, so that the first QB node QBn is charged to the high level. Accordingly, the eleventh transistor T11 may be turned on, so that the first Q node Qn is discharged to the low level. The thirteenth transistor T13 may be turned on, so that the nth carry line CRn is discharged to the low level. The fifteenth transistor T15 may be turned on, so that the nth sensing line SSn is discharged to the low level. The seventeenth transistor T17 may be turned on, so that the nth scan line SCn is discharged to the low level.

During a second frame interval FRAME2, a low-level control signal may be applied to the fifth control line CS5, and a high-level control signal may be applied to the sixth control line CS6. The thirty-fifth and thirty-sixth transistors T35 and T36 may be turned on, so that the second QB node QB(n+1) is charged to the high level. Accordingly, the twelfth transistor T12 may be turned on, so that the first Q node Qn is discharged to the low level. The fourteenth transistor T14 may be turned on, so that the nth carry line CRn is discharged to the low level. The sixteenth transistor T16 may be turned on, so that the nth sensing line SSn is discharged to the low level. The eighteenth transistor T18 may be turned on, so that the nth scan line SCn is discharged to the low level.

Thus, a period in which an on-bias is applied to the transistors used during the first and second frame intervals FRAME1 and FRAME2 can be shortened, and degradation of the transistors can be prevented.

According to driving of the scan driver, which is described with reference to FIG. 5, a high-level pulse may be applied to the scan line SCi and the sensing line SSi, which are described with reference to FIG. 2, during a display period of one frame interval. A corresponding data signal may be applied to the data line Dj, and a first reference voltage may be applied to the receiving line Ri. Accordingly, the storage capacitor Cst described with reference to FIG. 2 may store a voltage corresponding to the difference between the data signal and the first reference voltage during a state in which the second and third thin film transistors M2 and M3 are in a turn-on state. Subsequently, when the second and third thin film transistors M2 and M3 are turned off, an amount of driving current flowing through the first thin film transistor M1 may be determined corresponding to a voltage stored in the storage capacitor Cst, and the light emitting device LD may emit light with a luminance corresponding to the amount of driving current.

Figure 8:
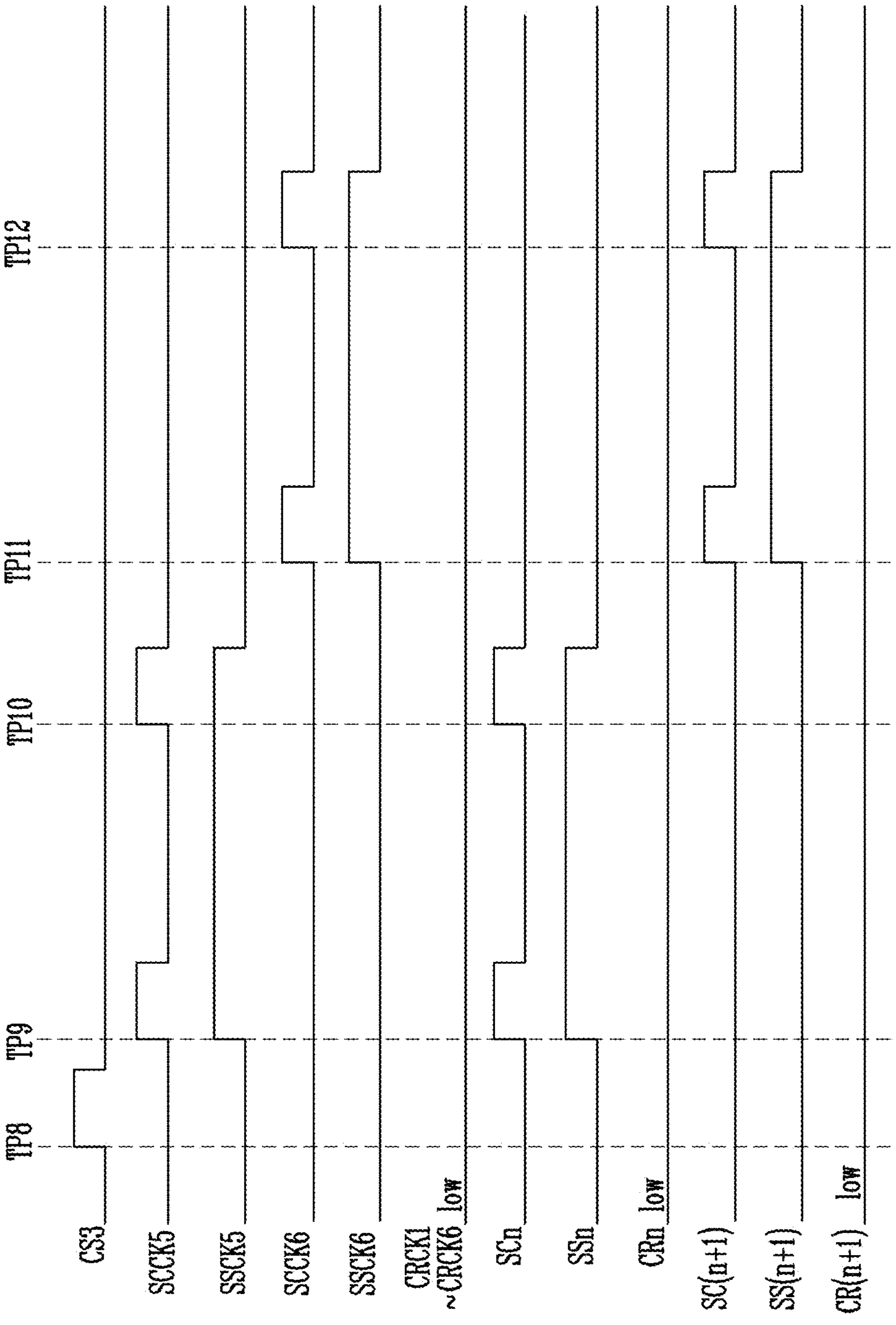
FIG. 8 is a diagram illustrating a driving method of the scan driver in a sensing period in accordance with an embodiment.

FIG. 8 is a diagram illustrating a driving method of the scan driver 13 in the sensing period in accordance with an embodiment.

Referring to FIGS. 4 and 8, signals are illustrated, which are applied to the third control line CS3, the fifth scan clock line SCCK5, the fifth sensing clock line SSCK5, the sixth scan clock line SCCK6, the sixth sensing clock line SSCK6, the carry clock lines CRCK1 to CRCK6, the nth scan line SCn, the (n+1)th scan line SC(n+1), the carry lines CRn and CR(n+1), the nth sensing line SSn, and the (n+1)th sensing line SS(n+1).

At an eighth time TP8, a high-level pulse may be generated in the third control line CS3. Accordingly, the sixth transistor TR6, see FIG. 4, may be turned on. The first capacitor C1 is in a state in which a voltage is charged in the first capacitor C1 during the display period, i.e., the period between the third time TP3 to the fourth time TP4, which is described with reference to FIG. 5, and thus, the fifth transistor T5 may be in the turn-on state. Accordingly, the high-level voltage applied to the second control line CS2 may be applied to the first Q node Qn through the fifth transistor T5 and the sixth transistor T6.

Since the fifth transistor (or forty-eighth transistor) is in the turn-off state in the other scan stages except the nth scan stage STn, the first Q node and the second Q node of each of the other scan stages may maintain the low level.

In an embodiment, the sixth capacitor C6 of the (n+1)th scan stage ST(n+1) may be in a state in which a voltage is charged in the sixth capacitor C6 during the display period. The forty-eighth transistor T48 may be in the turn-on state, and the high-level voltage applied to the third second control line CS3-CS2 may be applied to the second Q node Q(n+1) through the forty-seventh transistor T47 and the forty-eighth transistor T48.

Subsequently, at a ninth time TP9, a high-level signal may be applied to the fifth scan clock line SCCK5 and the fifth sensing clock line SSCK5. A voltage of the first Q node Qn may be boosted by the second and third capacitors C2 and C3, see FIG. 4, and a high-level signal may be output to the nth scan line SCn and the nth sensing line SSn.

Accordingly, the thin film transistors M2 and M3, see FIG. 2, of pixels coupled to the nth scan line SCn and the nth sensing line SSn may be turned on. A second reference voltage may be applied to data lines, and the sensor 14, see FIG. 1, may measure degradation information or characteristic information of the pixels according to current values or voltage values, which are received through the receiving lines (Rj, . . . ).

However, at the ninth time TP9, a low-level signal may be applied to the sixth scan clock line SCCK6 and the sixth sensing clock line SSCK6. Accordingly, a low-level signal may be output to the (n+1)th scan line SC(n+1) and the (n+1)th sensing line SS(n+1).

In addition, since nodes corresponding to the first Q node or the second Q node have the low level in the other scan stages, e.g., stages coupled to the fifth scan clock line SCCK5 and the fifth sensing clock line SSCK5, except the nth scan stage STn, a low-level signal may be output to corresponding scan lines and corresponding sensing lines, in spite of high-level pulses applied to the fifth scan clock line SCCK5 and the fifth sensing clock line SSCK5.

At a tenth time TP10, a high-level signal may be applied to the fifth scan clock line SCCK5 and the fifth sensing clock line SSCK5. Just previous data signals may be again applied to the data lines. Accordingly, the pixels coupled to the nth scan line SCn and the nth sensing line SSn may emit lights with grayscales based on the just previous data signals.

That is, although the pixels coupled to the nth scan line SCn and the nth sensing line SSn do not emit lights with the grayscales based on the data signals during a period between the ninth time TP9 and the tenth time TP10, the pixels coupled to the nth scan line SCn and the nth sensing line SSn again emit light with the grayscales based on the data signals after the tenth time TP10, and pixels coupled to other scan lines and other sensing lines may continuously emit the lights with the grayscales based on the data signals during the sensing period. Thus, there is no problem in that a user recognizes a frame.

Subsequently, at an eleventh time TP1, a high-level signal may be applied to the sixth scan clock line SCCK6 and the sixth sensing clock line SSCK6. A voltage of the second Q node Q(n+1) may be boosted by the fourth and fifth capacitors C4 and C5, see FIG. 4, of the (n+1)th scan stage ST(n+1) coupled to the sixth scan clock line SCCK6 and the sixth sensing clock line SSCK6, and a high-level signal may be output to the (n+1)th scan line SC(n+1) and the (n+1)th sensing line SS(n+1).

Accordingly, the thin film transistors M2 and M3, see FIG. 2, of pixels coupled to the (n+1)th scan line SC(n+1) and the (n+1)th sensing line SS(n+1) may be turned on. The second reference voltage may be applied to data lines, and the sensor 14, see FIG. 1, measure degradation information or characteristic information of the pixels according to current values or voltage values, which are received through the receiving lines (Rj, . . . ).

At a twelfth time TP12, a high-level signal may be applied to the sixth scan clock line SCCK6 and the sixth sensing clock line SSCK6. Just previous data signals may be again applied to the data lines. Accordingly, the pixels coupled (n+1)th scan line SC(n+1) and the (n+1)th sensing line SS(n+1) may emit light with grayscales based on the just previous data signals.

As described with reference to FIG. 8, the high-level signal is applied to the fifth scan clock line SCCK5 and the fifth sensing clock line SSCK5 in the period between the ninth time TP9 and the tenth time TP10, so that degradation information or characteristic information of the pixels coupled to the nth scan line SCn and the nth sensing line SSn can be measured. In addition, the high-level signal is applied to the sixth scan clock line SCCK6 and the sixth sensing clock line SSCK6 in a period between the eleventh time TP11 and the twelfth time TP12, so that degradation information or characteristic information of the pixels coupled to the (n+1)th scan line SC(n+1) and the (n+1)th sensing line SS(n+1) can be measured. That is, characteristics of pixels included in other pixel rows can be sensed (or multi-sensed) during one frame interval, and a total time (or sensing period) for which characteristics of all the pixels in the display panel are sensed can be decreased. Further, the characteristics of the pixels can be compensated in real time.

Figure 9:
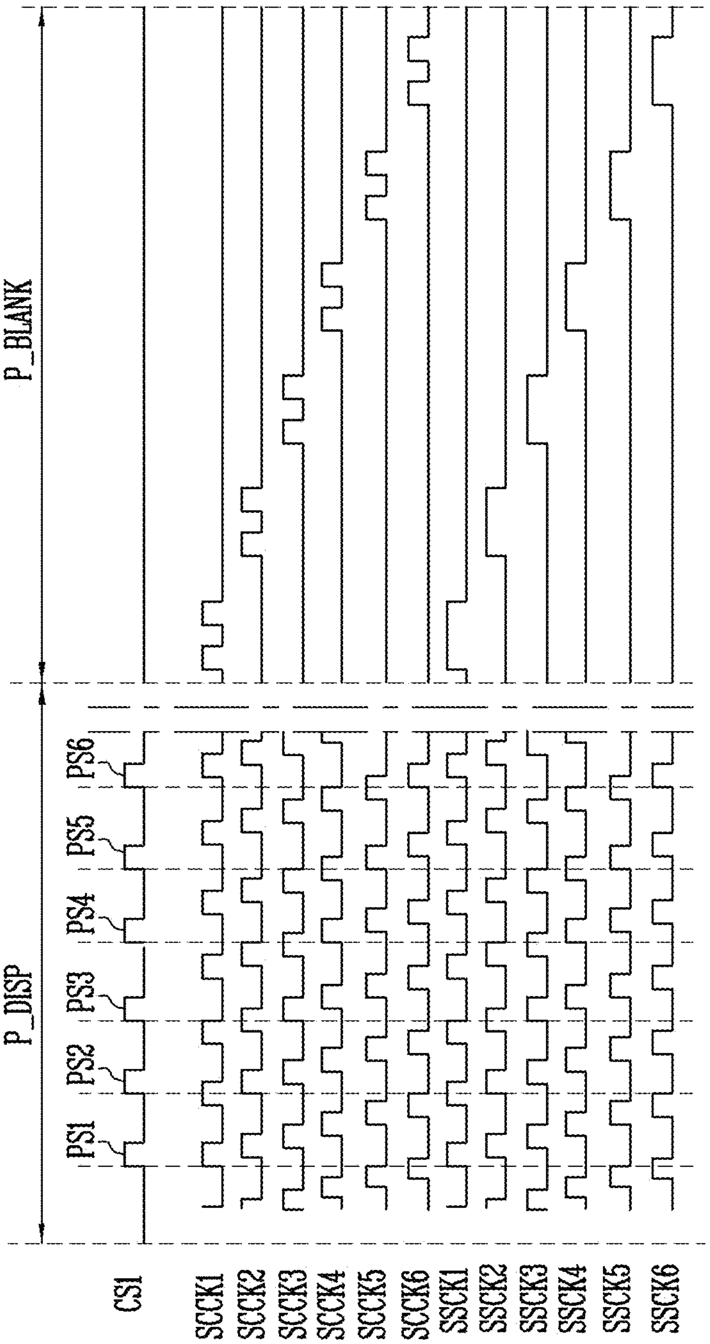
FIG. 9 is a diagram illustrating a driving method of the scan driver in accordance with an embodiment.

FIG. 9 is a diagram illustrating a driving method of the scan driver in accordance with an embodiment.

Referring to FIG. 9, signals are illustrated, which are applied to a first control line CS1, scan clock lines SCCK1 to SCCK6, and sensing clock lines SSCK1 to SSCK6.

In a display period P_DISP, the scan clock lines SCCK1 to SCCK6 and the sensing clock lines SSCK1 to SSCK6 are respectively substantially identical to the scan clock lines SCCK1 to SCCK6 and the sensing clock lines SSCK1 to SSCK6, which are described with reference to FIG. 5, and thus, overlapping descriptions will be omitted.

In the display period P_DISP, a signal of the first control line CS1 may include high-level pulses. For example, the signal of the first control signal CS1 may include first to sixth pulses PS1 to PS6 having the high level.

The first pulse PS1 may overlap with an interval in which a high-level signal is applied to a first scan clock line SCCK1 and a first sensing clock line SSCK1. However, this is merely illustrative, and the first pulse PS1 may overlap with an interval in which the high-level signal is applied a scan clock line and a sensing line, which are different from the first scan clock line SCCK1 and the first sensing clock line SSCK1.

Similarly, the second pulse PS2 may overlap with an interval in which a high-level signal is applied to a second scan clock line SCCK2 and a second sensing clock line SSCK2. The third pulse PS3 may overlap with an interval in which a high-level signal is applied to a third scan clock line SCCK3 and a third sensing clock line SSCK3. the fourth pulse PS4 may overlap with an interval in which a high-level signal is applied to a fourth scan clock line SCCK4 and a fourth sensing clock line SSCK4. The fifth pulse PS5 may overlap with an interval in which a high-level signal is applied to a fifth scan clock line SCCK5 and a fifth sensing clock line SSCK5. The sixth pulse PS6 may overlap with an interval in which a high-level signal is applied to a sixth scan clock line SCCK6 and a sixth sensing clock line SSCK6. That is, the first to sixth pulses PS1 to PS6 may have the high level, corresponding to different scan clock lines (and different sensing clock lines). Scan stages coupled to the different scan clock lines (and different sensing clock lines) may be selected as stages to operate in a sensing period.

Subsequently, in a sensing period P_BLANK, a high-level signal may be sequentially applied to the scan clock lines SCCK1 to SCCK6 and the sensing clock lines SSCK1 to SSCK6. A signal applied to each of the scan clock lines SCCK1 to SCCK6 may have a waveform identical or substantially identical to that of the signal, i.e., the signal applied to the fifth scan clock line SCCK5, described with reference to FIG. 8, and a signal applied to each of the sensing clock lines SSCK1 to SSCK6 may have a waveform identical or substantially identical to that of the signal, i.e., the signal applied to the fifth sensing clock line SSCK5, described with reference to FIG. 8. Accordingly, overlapping descriptions will be omitted.

Since the high-level signal is sequentially applied to the scan clock lines SCCK1 to SCCK6 and the sensing clock lines SSCK1 to SSCK6, the stages selected in the display period P_DISP may sequentially operate, and output a high-level signal to corresponding scan lines and corresponding sensing lines. Accordingly, characteristics of pixels included in six pixel rows may be sensed (or multi-sensed during the sensing period P_BLANK).

Meanwhile, although a case where the signal applied to the first control line CS1 includes six pulses during the display period P_DISP is illustrated in FIG. 9, this is merely illustrative. In an example, the signal applied to the first control line CS1 may include two to five pulses during the display period P_DISP. In another example, when the scan driver 13, see FIG. 1, includes k different scan clock lines and k different sensing clock lines, the signal applied to the first control line CS1 may include k pulses during the display period P_DISP.

Figure 10:
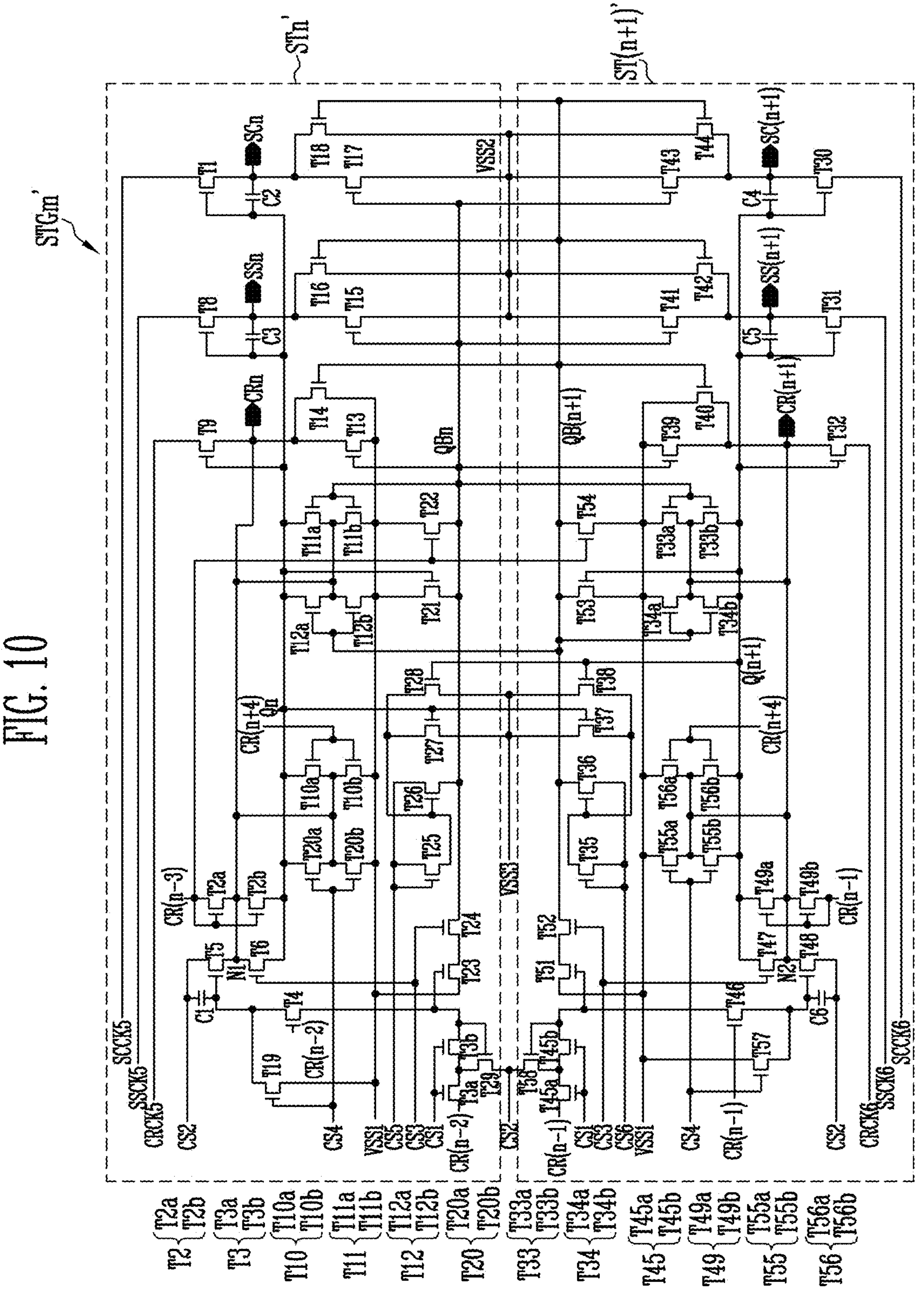
FIG. 10 is a circuit diagram illustrating the mth stage group included in the scan driver shown in FIG. 3 in accordance with an embodiment.

FIG. 10 is a circuit diagram illustrating the mth stage group included in the scan driver shown in FIG. 3 in accordance with an embodiment.

Referring to FIGS. 4 and 10, an mth stage group STGm' is different from the mth stage group STGm shown in FIG. 4, in that the mth stage group STGm' does not include the seventh transistor T7 and the fiftieth transistor T50. The mth stage group STGm' is substantially identical or similar to the mth stage group STGm shown in FIG. 4, and thus, overlapping descriptions will be omitted.

In an nth scan stage STn', the first node N1 may be coupled to the nth carry line CRn. When the first Q node Qn is boosted to a voltage higher than the high level, a high-level carry signal is applied to the first node N1, and thus degradation caused by an excessive voltage difference between drain and source electrodes of the transistors T6, T2*b*, T20*a*, T10*a*, T12*a*, and T11*a* can be prevented.

Similarly, in an (n+1)th scan stage ST(n+1)', the second node N2 may be coupled to the (n+1)th carry line CR(n+1). When the second Q node Q(n+1) is boosted to a voltage higher than the high level, a high-level carry signal is applied to the second node N2, and thus degradation caused by an excessive voltage difference between drain and source electrodes of the transistors T47, T49*a*, T55*b*, T34*b*, and T33*b* can be prevented.

In accordance with the present disclosure, the scan driver includes scan stages. Each of the scan stages stores a selected signal (or first control signal) in response to the selected signal and a sensing carry signal, and outputs a scan signal (and a sensing signal) in response to the selected signal and a scan clock signal (and a sensing clock signal). Thus, two or more stages can be selected by pulses of the selected signal during a display period in one frame, and sequentially provide scan signals (and sensing signals) to scan lines according to different clock signals (and different sensing clock signals) during a sensing period in the one frame.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A scan driver comprising:

stage groups each including a first scan stage and a second scan stage, wherein each of the first and second scan stages outputs a carry signal and a scan signal in response to a previous carry signal provided from a previous stage group, wherein each of the stage groups stores the previous carry signal provided from the previous stage group in a first capacitor, wherein each of the stage groups discharges a voltage stored in the first capacitor for the first and second scan stages to a second voltage level in response to a fourth control signal of a fourth control line, and wherein the first scan stage includes:

a second transistor including a first electrode electrically connected to a first previous carry line, a second electrode electrically connected to a first Q node, and a gate electrode electrically connected to the first electrode of the second transistor;

a ninth transistor including a first electrode electrically connected to a first carry clock line, a second electrode electrically connected to a first carry line, and a gate electrode electrically connected to the first Q node;

a first transistor including a first electrode electrically connected to a first scan clock line, a second electrode electrically connected to a first scan line, and a gate electrode electrically connected to the first Q node;

a sixth transistor including a first electrode electrically connected to a first node, a second electrode electrically connected to the first Q node, and a gate electrode electrically connected to a third control line;

a fifth transistor including a first electrode electrically connected to a second control line, a second electrode electrically connected to the first node, and a gate electrode;

a nineteenth transistor electrically connected to the gate electrode of the fifth transistor and including a gate electrode electrically connected to the fourth control line;

a twenty-fifth transistor including a first electrode electrically connected to a fifth control line, a second electrode, and a gate electrode electrically connected to the fifth control line; and a twenty-sixth transistor including a first electrode electrically connected to the fifth control line, a second electrode electrically connected to a first QB node, and a gate electrode electrically connected to the second electrode of the twenty-fifth transistor, and wherein the first capacitor is electrically connected between the second control line and the gate electrode of the fifth transistor.

2. The scan driver of claim 1, wherein the first scan stage further includes:

a thirteenth transistor including a first electrode electrically connected to the first carry line, a second electrode electrically connected to a first power line, and a gate electrode electrically connected to a first QB node; and a fourteenth transistor including a first electrode electrically connected to the first carry line, a second electrode electrically connected to the first power line, and a gate electrode electrically connected to a second QB node of the second scan stage.

3. The scan driver of claim 1, wherein the first scan stage further includes:

a second capacitor electrically connected between the first Q node and the first scan line;

a seventeenth transistor including a first electrode electrically connected to the first scan line, a second electrode electrically connected to a second power line, and a gate electrode electrically connected to a first QB node; and an eighteenth transistor including a first electrode electrically connected to the first scan line, a second electrode electrically connected to the second power line, and a gate electrode electrically connected to a second QB node of the second scan stage.

4. The scan driver of claim 1, wherein the first scan stage further includes:

an eleventh transistor including a first electrode electrically connected to the first Q node, a second electrode electrically connected to a first power line, and a gate electrode electrically connected to a first QB node;

a twelfth transistor including a first electrode electrically connected to the first Q node, a second electrode electrically connected to the first power line, and a gate electrode electrically connected to a second QB node of the second scan stage;

a twenty-first transistor including a first electrode electrically connected to the first power line, a second electrode electrically connected to the first QB node, and a gate electrode electrically connected to the first QB node; and a twenty-second transistor including a first electrode electrically connected to the first power line, a second electrode electrically connected to the first QB node, and a gate electrode electrically connected to the first previous carry line.

5. The scan driver of claim 1, wherein the first scan stage further includes:

a twenty-seventh transistor including a first electrode electrically connected to the second electrode of the twenty-fifth transistor, a second electrode electrically connected to a third power line, and a gate electrode electrically connected to the first Q node; and a twenty-eighth transistor including a first electrode electrically connected to the second electrode of the twenty-fifth transistor, a second electrode electrically connected to the third power line, and a gate electrode electrically connected to a second Q node of the second scan stage.

6. The scan driver of claim 1, wherein the first scan stage further includes:

a twenty-third transistor including a first electrode electrically connected to a first power line, a second electrode, and a gate electrode electrically connected to the gate electrode of the fifth transistor; and a twenty-fourth transistor including a first electrode electrically connected to the second electrode of the twenty-third transistor, a second electrode electrically connected to a first QB node, and a gate electrode electrically connected to the third control line.

7. The scan driver of claim 1, wherein the first scan stage further includes:

a tenth transistor including a first electrode electrically connected to the first Q node, a second electrode electrically connected to a first power line, and a gate electrode electrically connected to a next carry line.

8. The scan driver of claim 1, wherein the second transistor includes a first sub-transistor electrically connected between the first previous carry line and a third node and a second sub-transistor electrically connected between the third node and the first Q node, wherein the first scan stage further includes a seventh transistor including a gate electrode electrically connected to the first Q node, a first electrode electrically connected to the second control line, and a second electrode electrically connected to the third node.

9. The scan driver of claim 1, wherein the second scan stage includes:

wherein the first scan stage includes:

a forty-ninth transistor including a first electrode electrically connected to a second previous carry line, a second electrode electrically connected to a second Q node, and a gate electrode electrically connected to the first electrode of the forty-ninth transistor;

a thirty-second transistor including a first electrode electrically connected to a second carry clock line, a second electrode electrically connected to a second carry line, and a gate electrode electrically connected to the first Q node;

a thirtieth transistor including a first electrode electrically connected to a second scan clock line, a second electrode electrically connected to a second scan line, and a gate electrode electrically connected to the second Q node;

a forty-seventh transistor including a first electrode electrically connected to a second node, a second electrode electrically connected to the second Q node, and a gate electrode electrically connected to the third control line; and a fiftieth transistor including a gate electrode electrically connected to the second Q node, a first electrode electrically connected to the second control line, and a second electrode electrically connected to a fourth node, and wherein the forty-ninth transistor includes a third sub-transistor electrically connected between the second Q node and the fourth node and a fourth sub-transistor electrically connected between the fourth node and the second previous carry line.

10. The scan driver of claim 9, wherein the second scan stage further includes:

a thirty-ninth transistor including a first electrode electrically connected to the second carry line, a second electrode electrically connected to a first power line, and a gate electrode electrically connected to a first QB node of the first scan stage; and a fortieth transistor including a first electrode electrically connected to the second carry line, a second electrode electrically connected to the first power line, and a gate electrode electrically connected to a second QB node.

11. The scan driver of claim 9, wherein the second scan stage further includes:

a fourth capacitor electrically connected between the second Q node and the second scan line;

a forty-third transistor including a first electrode electrically connected to the second scan line, a second electrode electrically connected to a second power line, and a gate electrode electrically connected to a first QB node of the first scan stage; and a forty-fourth transistor including a first electrode electrically connected to the scan line, a second electrode electrically connected to the second power line, and a gate electrode electrically connected to a second QB node.

12. The scan driver of claim 9, wherein the second scan stage further includes:

a thirty-third transistor including a first electrode electrically connected to the second Q node, a second electrode electrically connected to a first power line, and a gate electrode electrically connected to a first QB node of the first scan stage;

a thirty-fourth transistor including a first electrode electrically connected to the first Q node, a second electrode electrically connected to the first power line, and a gate electrode electrically connected to a second QB node;

a fifty-third transistor including a first electrode electrically connected to the first power line, a second electrode electrically connected to the second QB node, and a gate electrode electrically connected to the second QB node;

a fifty-fourth transistor including a first electrode electrically connected to the first power line, a second electrode electrically connected to the second QB node, and a gate electrode electrically connected to the second previous carry line, a thirty-fifth transistor including a first electrode electrically connected to a sixth control line, a second electrode, and a gate electrode electrically connected to the sixth control line;

a thirty-sixth transistor including a first electrode electrically connected to the sixth control line, a second electrode electrically connected to the second QB node, and a gate electrode electrically connected to the second electrode of the thirty-fifth transistor;

a thirty-seventh transistor including a first electrode electrically connected to the second electrode of the thirty-fifth transistor, a second electrode electrically connected to a third power line, and a gate electrode electrically connected to the first Q node of the first scan stage; and a thirty-eighth transistor including a first electrode electrically connected to the second electrode of the thirty-fifth transistor, a second electrode electrically connected to the third power line, and a gate electrode electrically connected to the second Q node.

13. A scan driver comprising:

stage groups each including a first scan stage and a second scan stage, wherein each of the first and second scan stages outputs a carry signal and a scan signal in response to a previous carry signal provided from a previous stage group, wherein each of the stage groups stores the previous carry signal provided from the previous stage group in a first capacitor, wherein each of the stage groups discharges a voltage stored in the first capacitor for the first and second scan stages to a second voltage level in response to a first control signal of a first control line, and wherein each of the stage groups includes:

a fifth transistor including a first electrode electrically connected to a second control line, a second electrode electrically connected to a first node, and a gate electrode;

the first capacitor electrically connected between the second control line and the gate electrode of the fifth transistor; and a third transistor including a first electrode electrically connected to a previous carry line, a second electrode electrically connected to the gate electrode of the fifth transistor, and a gate electrode electrically connected to the first control line, and wherein each of the first and second scan stages includes:

a second transistor including a first electrode electrically connected to a corresponding previous carry line, a second electrode electrically connected to a Q node, and a gate electrode electrically connected to the first electrode of the second transistor;

a ninth transistor including a first electrode electrically connected to a carry clock line, a second electrode electrically connected to a corresponding carry line, and a gate electrode electrically connected to the Q node;

a first transistor including a first electrode electrically connected to a scan clock line, a second electrode electrically connected to a corresponding scan line, and a gate electrode electrically connected to the Q node;

a sixth transistor including a first electrode electrically connected to the first node, a second electrode electrically connected to the Q node, and a gate electrode electrically connected to a third control line;

a twenty-fifth transistor including a first electrode electrically connected to a fifth control line, a second electrode, and a gate electrode electrically connected to the fifth control line; and a twenty-sixth transistor including a first electrode electrically connected to the fifth control line, a second electrode electrically connected to a QB node, and a gate electrode electrically connected to the second electrode of the twenty-fifth transistor.

14. The scan driver of claim 13, wherein the third transistor includes:

a fifth sub-transistor including a gate electrode electrically connected to the first control line and a first electrode electrically connected to the previous carry line; and a sixth sub-transistor including a gate electrode electrically connected to the first control line, a first electrode electrically connected to a second electrode of the fifth sub-transistor, and a second electrode electrically connected to the gate electrode of the fifth transistor, and wherein each of the stage groups further includes:

a twenty-ninth transistor including a gate electrode electrically connected to the second electrode of the sixth sub-transistor, a first electrode electrically connected to the first electrode of the sixth sub-transistor, and a second electrode electrically connected to the second control line.

15. The scan driver of claim 13, wherein each of the first and second scan stages further includes:

a thirteenth transistor including a first electrode electrically connected to the corresponding carry line, a second electrode electrically connected to a first power line, and a gate electrode electrically connected to a QB node of the first scan stage; and a fourteenth transistor including a first electrode electrically connected to the corresponding carry line, a second electrode electrically connected to the first power line, and a gate electrode electrically connected to a QB node of the second scan stage.

16. The scan driver of claim 13, wherein each of the first and second scan stages further includes:

a second capacitor electrically connected between the Q node and the corresponding scan line;

a seventeenth transistor including a first electrode electrically connected to the corresponding scan line, a second electrode electrically connected to a second power line, and a gate electrode electrically connected to a QB node of the first scan stage; and an eighteenth transistor including a first electrode electrically connected to the corresponding scan line, a second electrode electrically connected to the second power line, and a gate electrode electrically connected to a QB node of the second scan stage.

17. The scan driver of claim 13, wherein each of the first and second scan stages further includes:

an eleventh transistor including a first electrode electrically connected to the Q node, a second electrode electrically connected to a first power line, and a gate electrode electrically connected to a QB node of the first scan stage;

a twelfth transistor including a first electrode electrically connected to the Q node, a second electrode electrically connected to the first power line, and a gate electrode electrically connected to a QB node of the second scan stage;

a twenty-first transistor including a first electrode electrically connected to the first power line, a second electrode electrically connected to the QB node, and a gate electrode electrically connected to a corresponding QB node of one of the first and second scan stages; and a twenty-second transistor including a first electrode electrically connected to the first power line, a second electrode electrically connected to the corresponding QB node, and a gate electrode electrically connected to the corresponding previous carry line.

18. The scan driver of claim 13, wherein each of the first and second scan stages further includes:

a twenty-seventh transistor including a first electrode electrically connected to the second electrode of the twenty-fifth transistor, a second electrode electrically connected to a third power line, and a gate electrode electrically connected to the Q node of the first scan stage; and a twenty-eighth transistor including a first electrode electrically connected to the second electrode of the twenty-fifth transistor, a second electrode electrically connected to the third power line, and a gate electrode electrically connected to the Q node of the second scan stage.

19. The scan driver of claim 13, wherein each of the first and second scan stages further includes:

a twenty-third transistor including a first electrode electrically connected to a first power line, a second electrode, and a gate electrode electrically connected to the gate electrode of the fifth transistor;

a twenty-fourth transistor including a first electrode electrically connected to the second electrode of the twenty-third transistor, a second electrode electrically connected to a QB node, and a gate electrode electrically connected to the third control line a tenth transistor including a first electrode electrically connected to the Q node, a second electrode electrically connected to a first power line, and a gate electrode electrically connected to a next carry line; and a twentieth transistor including a first electrode electrically connected to the Q node, a second electrode electrically connected to the first power line, and a gate electrode electrically connected to a fourth control line.

20. The scan driver of claim 13, wherein the second transistor includes a first sub-transistor electrically connected between the corresponding previous carry line and a third node and a second sub-transistor electrically connected between the third node and the Q node, wherein each of the first and second scan stages further includes a seventh transistor including a gate electrode electrically connected to the Q node, a first electrode electrically connected to the second control line, and a second electrode electrically connected to the third node.

* * * * *